(12) United States Patent
Guo et al.

(10) Patent No.: US 7,863,875 B1
(45) Date of Patent: Jan. 4, 2011

(54) NON-LINEAR CONTROL TECHNIQUES FOR IMPROVING TRANSIENT RESPONSE TO LOAD CURRENT STEP CHANGE

(75) Inventors: Yigang Guo, Cupertino, CA (US); Francesco Carobolante, Danville, CA (US)

(73) Assignee: Fairchild Semiconductor Corporation, South Portland, ME (US)

( * ) Notice: Subject to any disclaimer, the term of this patent is extended or adjusted under 35 U.S.C. 154(b) by 315 days.

(21) Appl. No.: 12/108,435

(22) Filed: Apr. 23, 2008

(51) Int. Cl.
*G05F 1/565* (2006.01)
*G05F 1/40* (2006.01)

(52) U.S. Cl. ............................ 323/275; 323/285

(58) Field of Classification Search ......... 323/222–226, 323/268–277, 282, 285–288
See application file for complete search history.

(56) References Cited

U.S. PATENT DOCUMENTS

| | | | |
|---|---|---|---|
| 4,243,975 A | 1/1981 | Masuda et al. | |
| 5,852,415 A | 12/1998 | Cotter et al. | |
| 6,226,419 B1 | 5/2001 | Lodwick et al. | |
| 6,320,426 B1 | 11/2001 | Shih | |
| 6,459,335 B1 | 10/2002 | Darmawaskita et al. | |
| 6,535,061 B2 | 3/2003 | Darmawaskita et al. | |
| 6,683,441 B2 | 1/2004 | Schiff et al. | |
| 6,809,504 B2 * | 10/2004 | Tang et al. | 323/274 |
| 7,064,528 B2 | 6/2006 | Jochum et al. | |
| 7,064,693 B1 | 6/2006 | Huang et al. | |
| 7,133,751 B2 | 11/2006 | Kurd et al. | |
| 7,135,836 B2 | 11/2006 | Kutkut et al. | |
| 7,157,924 B2 | 1/2007 | Muhtaroglu et al. | |
| 7,158,395 B2 | 1/2007 | Deng et al. | |
| 7,164,275 B2 | 1/2007 | Gasperi | |
| 7,170,765 B2 | 1/2007 | Huang | |
| 7,180,919 B2 | 2/2007 | Kurusu | |
| 7,202,646 B2 | 4/2007 | Vinciarelli | |
| 7,225,349 B2 | 5/2007 | Tam et al. | |
| 7,248,082 B2 | 7/2007 | Nakasha et al. | |
| 7,256,089 B2 | 8/2007 | List et al. | |

(Continued)

OTHER PUBLICATIONS

8-Bit Programmable 2-to 4- Phase Synchronous Buck Controller, Apr. 12, 2006, pp. 1-32, Preliminary Technical Data, ADP3192, 2004 Analog Devices, Inc. All rights reserved.

(Continued)

*Primary Examiner*—Matthew V Nguyen
(74) *Attorney, Agent, or Firm*—Okamoto & Benedicto LLP

(57) ABSTRACT

A voltage regulator may be configured to detect variation in load current and control transient response when the load current has a high slew rate or varies at high repetition rates. A linear control circuit may be employed to control charging of an output capacitor and a load of the regulator. Upon detection of high load current step-up change at high slew rates, a non-linear control circuit may be activated. The fast load current step change may be detected by comparing an output voltage of the regulator to a feedback input of an error amplifier of the linear control circuit. The output of the error amplifier may be clamped to prevent output voltage ring-back when using the non-linear control circuit or to control load release dip. Output voltage overshoot may be controlled by turning OFF a top switch that charges the output capacitor before the inductor current becomes zero.

15 Claims, 20 Drawing Sheets

U.S. PATENT DOCUMENTS

| | | |
|---|---|---|
| 7,274,181 B2 | 9/2007 | Schrom et al. |
| RE39,976 E | 1/2008 | Schiff et al. |
| 7,339,357 B2 | 3/2008 | Lopata |
| 7,417,879 B2 * | 8/2008 | Sawtell .................. 363/89 |
| 7,521,907 B2 * | 4/2009 | Cervera et al. ............ 323/268 |
| 7,615,982 B1 * | 11/2009 | Guo ...................... 323/285 |

OTHER PUBLICATIONS

Forghani-Zadeh,H.S, et al. , "Current-Sensing Techniques for DC-DC Converters", Published 2002, pp. 1-4, IEEE, Georgia Tech Analog Consortium, Georgia Institute of Technology, Atlanta, GA.

"8-Bit Programmable, 2- to 3- Phase Synchronous Buck Controller", Jan. 2007, pp. 1-39, FAN5033 Rev 1.0.0, Fairchild Semiconductor Corportation.

"8-Bit Programmable 2- to 5- Phase Synchronous Buck Controller", Jan. 2007, pp. 1-3, FAN5029 Rev. 1.1.3, Fairchild Semiconductor Corporation.

"6-Bit VID Controller 2-4 Phase VRM 10.X Controller", Jan. 5, 2004, pp. 1-30, FAN5019 Rev. 1.0.7, Fairchild Semiconductor Corporation.

"8-Bit Programmable, 2 to 4 Phase, Synchronous Buck Controller", Mar. 2006, pp. 1-3, FAN5031 Rev. 1.0.1, Fairchild Semiconductor Corporation.

* cited by examiner

NON-LINEAR CONTROL TECHNIQUES FOR IMPROVING TRANSIENT RESPONSE TO LOAD CURRENT STEP CHANGE

BACKGROUND OF THE INVENTION

1. Field of the Invention

The present invention relates generally to electrical circuits, and more particularly but not exclusively to voltage regulators.

2. Description of the Background Art

A voltage regulator generates a regulated output voltage VOUT from an input voltage VIN. Ideally, the voltage regulator maintains the output voltage VOUT within regulation despite varying load current. However, this is not always the case in real world conditions. One instance is when the load current is varying at high slew rates and high repetition rates, which may be as much as 1000 A/µs slew rate and up to 1 MHz repetition rate. For example, a microprocessor waking out of "sleep" mode may activate a large number of dormant circuits, resulting in a large step change in load current within a relatively short period of time. As another example, the current drawn by a microprocessor may toggle at high repetition rates when running video games. In these cases, the regulator may not be able to respond fast enough to maintain the output voltage VOUT within regulation.

The present disclosure pertains to techniques for improving a voltage regulator's transient response to load current with high slew rates and, in particular but not exclusively, with high repetition rates.

SUMMARY

A voltage regulator may be configured to detect variation in load current and control transient response when the load current varies at high slew rates and/or high repetition rates. A linear control circuit may be employed to regulate the output voltage within its tolerance band. Upon detection of fast load current step-up change, a non-linear control circuit may be used to expand the limited linear control bandwidth. The fast load current step-up change may be detected by comparing an output voltage of the regulator to a feedback input of an error amplifier of the linear control circuit. The output of the error amplifier may be adaptively clamped to prevent output voltage ring-back when using the non-linear control circuit and/or to control load release dip. Output voltage overshoot may be controlled by turning OFF a top switch that charges the output capacitor well before the inductor current reaches zero.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Non-Linear Control

Load current is the electrical current drawn by the load from the regulator. For purposes of the present disclosure, a load current has a high slew rate when it has a slew rate of around 100 A/µs and above, and has a high repetition rate when its repetition rate is around 100 kHz and above. A load current step change is a fast change in load current. A step change may be a step-up change where the load current rapidly changes from low to high, or a step-down change where the load current rapidly changes from high to low.

A load current step change may result in fast load current slew rates. When this occurs, the delay between the load current step change and the regulator's switching response to the step change is crucial. In addition, due to the current slew rate limitation of the power inductor to respond to changes in load current, the regulator's output voltage undershoot or overshoot will be very high even when the regulator is capable of instantly turning ON or OFF the associated switch. These are major limitations of voltage regulators that employ conventional linear controllers. Embodiments of the present invention address these issues by providing a non-linear control scheme that rapidly responds to a fast load current step-up change.

Figure 1:
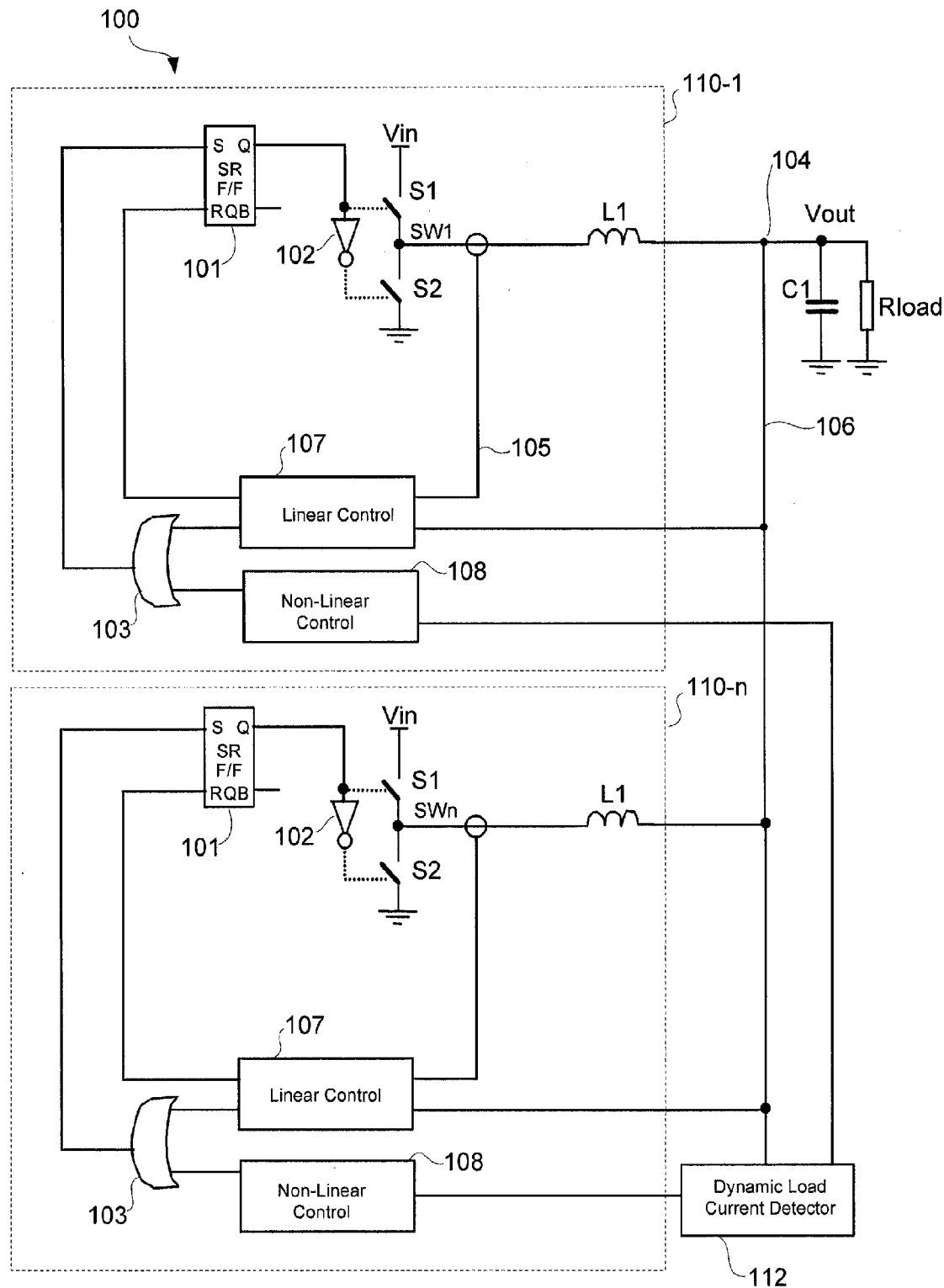
FIG. 1 schematically shows a voltage regulator in accordance with an embodiment of the present invention.

FIG. 1 schematically shows a voltage regulator 100 in accordance with an embodiment of the present invention. In the example of FIG. 1, the regulator 100 is a buck regulator that takes an input voltage VIN to generate an output voltage VOUT. The regulator 100 is a multi-phase regulator with a phase output block 110 (i.e., 110-1, . . . , 110-n) for each phase. As can be appreciated, the output blocks 110 operate the same way except for the different phase shifting of their linear clocks, or so called inter-leaving. Accordingly, the regulator 100 is explained with reference to one of its phases for clarity of illustration. The same explanation applies to other phases.

For each phase of the regulator 100, the switches S1 and S2 represent synchronously switched transistors (e.g., MOSFET). An inverter 102 allows the switch S2 to be OFF (i.e., open) when the switch S1 is turned ON (i.e., closed), and to be ON when the switch S1 is turned OFF. The switch S1, also referred to as the "top transistor" or "top switch," is turned ON to allow the input power supply providing the input voltage VIN to charge an output capacitor C1 and the load Rload through an output inductor L1, and thereby increase the voltage across the load Rload. The switch S1 is turned OFF to stop charging the output capacitor C1 and the load Rload, decreasing the voltage across the capacitor C1 over time. By controlling the switching of the switches S1 and S2, the output voltage VOUT across the load Rload at the node 104 can be maintained within regulation.

A dynamic load current detector 112 may comprise an electrical circuit that detects when load current drawn by the load varies at high slew rate and/or high repetition rates. The dynamic load current detector 112 may be configured to enable or so inform a non-linear control circuit 108 when the load current is stepping-up at high slew rate and the load current step size exceeds a pre-determined non-linear control threshold.

In the example of FIG. 1, a linear control circuit 107 controls the switching of the switches S1 and S2 when the load current is relatively stable. The non-linear control circuit 108 does not intervene during this time. In that case, the linear control circuit 107 monitors the inductor current, which is the electrical current flowing through the output inductor L1. The inductor current is indicative of load current. A path 105 may include a lossless current sense circuit (not shown) or other conventional current sense circuit for allowing the linear control circuit 107 to monitor inductor current. The linear control circuit 107 may employ the inductor current information for current mode control and phase current balancing control.

The linear control circuit 107 may monitor the output voltage VOUT (see path 106) to determine its value relative to a reference voltage, and control the switching of the switches S1 and S2 accordingly. The linear control circuit 107 may generate a linear clock signal through an OR gate 103 to periodically set the SR flip-flop 101 and thereby turn ON the top switch (i.e., switch S1) to charge the output capacitor C1 and source current to the load Rload. The linear control circuit 107 may generate a reset signal to reset the SR flip-flop 101 to turn OFF the top switch and turn ON the bottom switch (i.e., switch S2).

When the load current steps-up at a high slew rate, the linear control circuit 107 may not be able to turn ON the top switch fast enough to prevent the output voltage VOUT from dropping below regulation. In that situation, the dynamic load current detector 112 detects the step-up change in load current and so informs the non-linear control circuit 108. In response, the non-linear control circuit 108 generates a signal to set the SR flip-flop 101 to turn ON the top switch. The OR gate 103 allows the signal from the non-linear control circuit 108 to set the SR flip-flop 101 independent of the linear control circuit 107. In effect, the non-linear control circuit 108 charges the output capacitor C1 and the load Rload in between charging by the linear control circuit 107. This advantageously prevents the voltage VOUT from dropping out of regulation in the event of a rapid change in load current.

Figure 2:
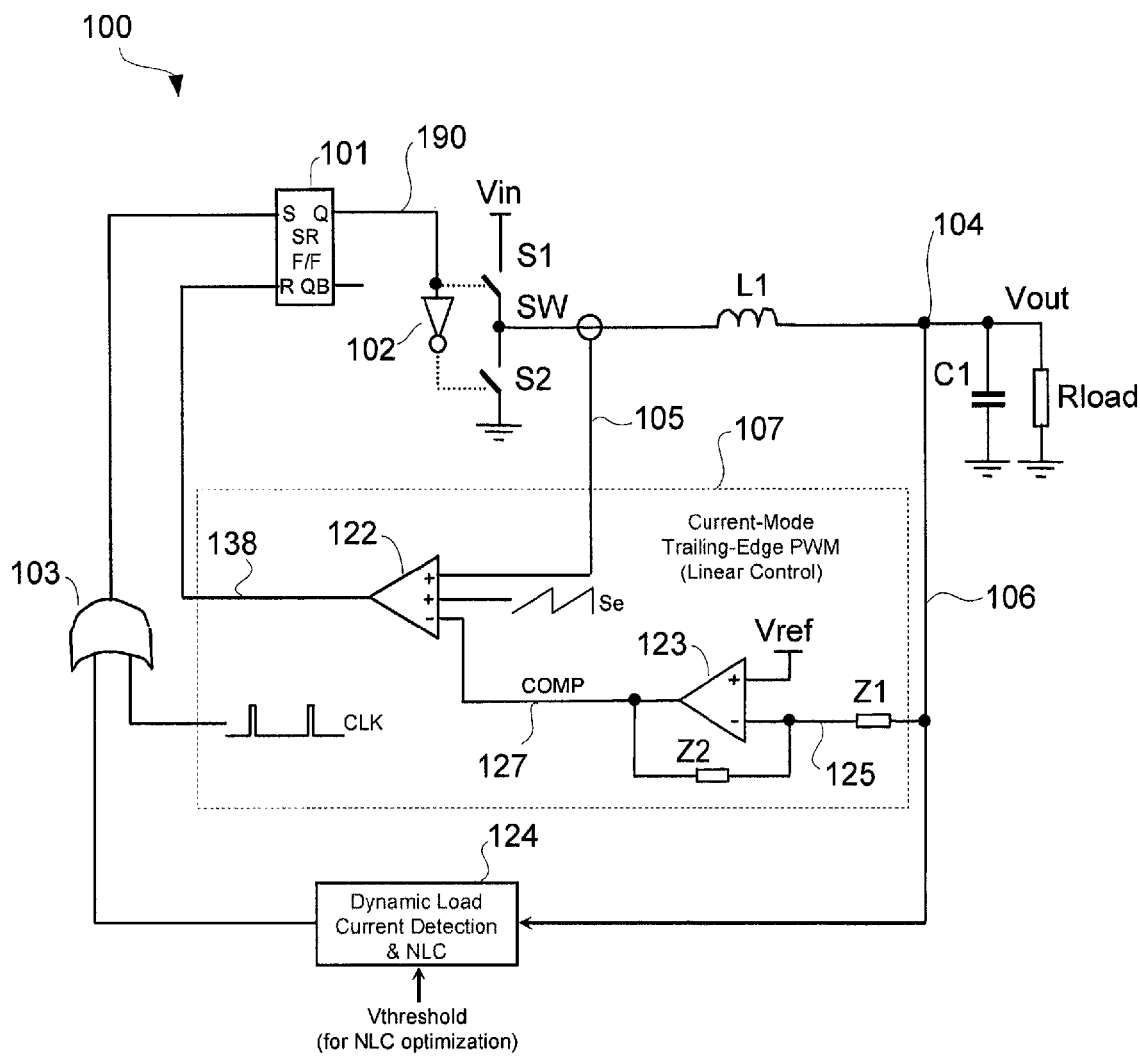
FIG. 2 schematically shows details of the regulator of FIG. 1 in accordance with an embodiment of the present invention.

FIG. 2 schematically shows details of the regulator 100 in accordance with an embodiment of the present invention. Only one phase output block of the regulator 100 is shown in FIG. 2 for clarity of illustration. In the example of FIG. 2, the linear control circuit 107 is configured for peak current-mode trailing-edge PWM (pulse width modulation) linear control. The current loop of the current mode control of the regulator 100 includes the path 105, while the voltage loop of the regulator 100 includes the path 106.

As shown in FIG. 2, the linear control circuit 107 generates a clock signal through the OR gate 103 to periodically turn ON the top switch. A voltage error amplifier 123 coupled to the voltage loop compares the output voltage VOUT to a reference voltage VREF to regulate the output voltage VOUT within regulation tolerance band. The output of the error amplifier 123 at a node 127 is also referred to as the comparison signal "COMP." As can be appreciated, the comparison signal COMP may be provided to several phase output blocks 110.

The gain of the error amplifier 123 is governed by the ratio of impedance network Z2 to impedance network Z1. Impedance networks Z1 and Z2 may each represent a combination of resistors and capacitors. As will be more apparent below, the feedback signal FB at the input node 125 of the error amplifier 123 may be compared to the output voltage VOUT on the other side of the input impedance network Z1 to detect rapid change in load current. A PWM comparator 122 compares the sensed inductor current plus the external ramp signal (labeled as "Se") and the output of the error amplifier 123 to control turning OFF of the top switch S1. Generally speaking, the comparator 122 sends a reset signal to the SR flip-flop 101 to turn OFF the top switch S1 and turn ON the bottom switch S2 when the inductor current plus the external ramp signal exceeds the magnitude of the comparison signal COMP.

In the example of FIG. 2, the dynamic load current detection and non-linear control block 124 represents the non-linear control circuit 108 and the dynamic load current detector 112 of FIG. 1. The block 124 may accept a threshold voltage input Vthreshold for non-linear control optimization.

Figure 3:
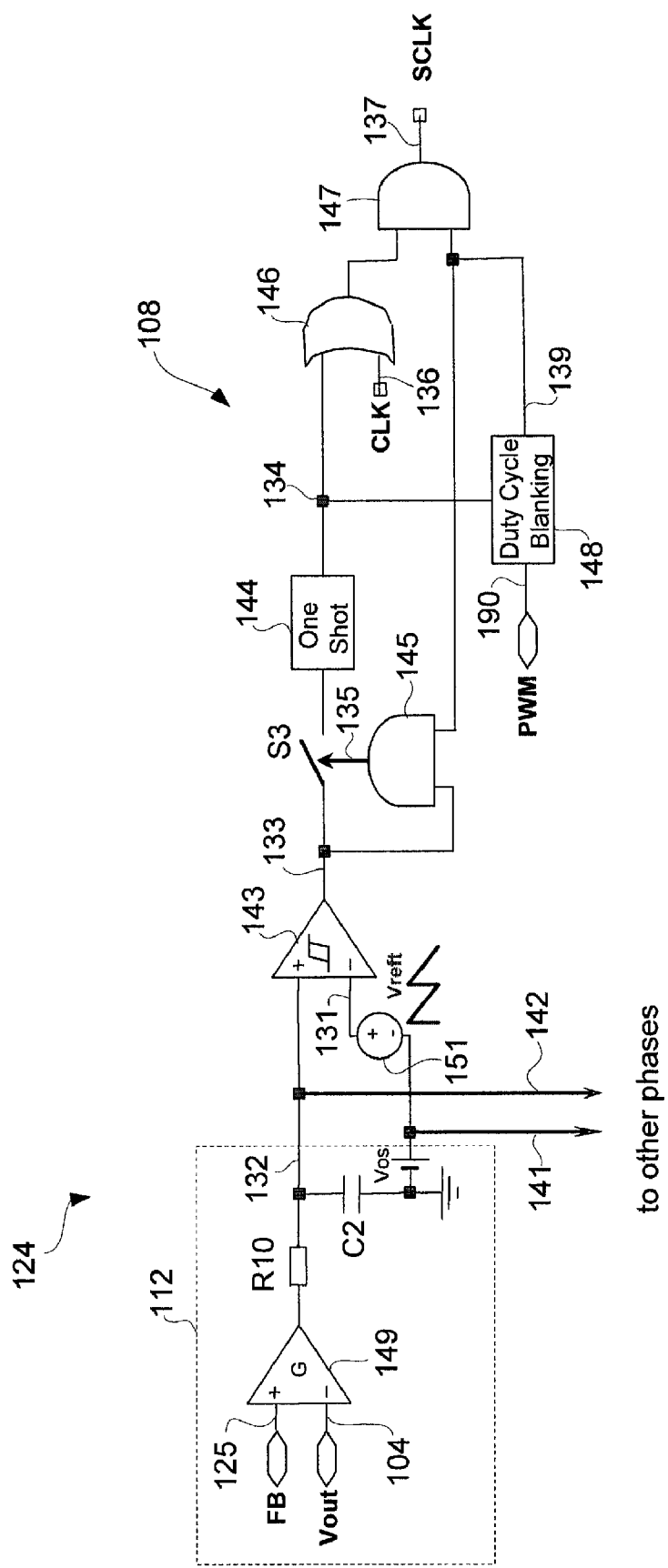
FIG. 3 schematically shows details of a dynamic load current detection and non-linear control block in accordance with an embodiment of the present invention.

FIG. 3 schematically shows details of the dynamic load current detection and non-linear control block 124 in accordance with an embodiment of the present invention. The block 124 includes a dynamic current load detector 112 and a non-linear control circuit 108. As shown in FIG. 1, a single dynamic current load detector 112 may be shared by several phase output blocks 110. This is also shown in FIG. 3, where the output of the dynamic load current detector 112 may be coupled to other non-linear control circuits 108 of other phase output blocks by way of lines 141 and 142.

In the example of FIG. 3, the dynamic load current detector 112 includes an amplifier 149 that takes a feedback signal FB at the node 125 and the output voltage VOUT at the node 104 as inputs. Nodes 104 and node 125 are shown in FIG. 2 along with the error amplifier 123. Because of the high gain of the error amplifier 123, the feedback signal FB is relatively constant and is essentially the same as the reference signal VREF. In contrast, the output voltage VOUT changes with the load current. Therefore, the difference between the feedback signal FB and the output voltage VOUT is indicative of change in load current. The larger the change in load current, the larger the difference.

Still referring to FIG. 3, the load current change information is output by the amplifier 149 and filtered by a noise filter formed by a resistor R10 and a capacitor C2. A comparator 143 compares the load current change information with a periodic sawtooth signal VREFT to determine if the load current step change is large enough to trigger the non-linear control circuit 108 to turn ON the top switch of the phase output block 110. An offset voltage VOS allows the signal VREFT to be adjusted for optimization. The resulting signal at the node 131 is also referred to as a non-linear control ramp.

When the load current steps-up at high slew rates, the load current step change indicated at the node 132 will be higher than the non-linear control ramp at the node 131. This results in the comparator 143 triggering a one-shot circuit 144 to output a pulse of the signal SCLK through the OR gate 146 and AND gate 137. The pulse of the signal SCLK sets a corresponding SR flip-flop 101 to turn ON the top switch, thereby allowing the power supply providing the input voltage VIN to provide power to the load in response to the rapidly increasing load current. The periodic linear clock signal CLK at a node 136 is generated by the linear control circuit 107 to set the SR flip-flop 101 to turn ON the top switch during normal operation.

A duty cycle blanking circuit 148 is configured to remove SCKL pulses that are too close to one another, which may be due to noise or linear or non-linear operation. This advantageously prevents the top switch from being turned ON too frequently, possibly introducing stability and reliability issues. In the example of FIG. 3, the duty cycle blanking circuit 148 receives a PWM signal at a node 190, which is the output of the SR flip-flop 101 (see FIG. 2). The PWM signal controls the top switch (switch S1) turn ON and OFF. The duty cycle blanking circuit 148 generates a blanking signal at a node 139 right after the top switch is turned OFF. The blanking signal disables for a predetermined blanking time (a) the switch S3 by way of the AND gate 145 to prevent the comparator 143 from triggering the one-shot circuit 144 and (b) the AND gate 147 to prevent the linear clock signal CLK or the non-linear one-shot at node 134 from propagating to the SR flip-flop 101. This prevents the top switch from being turned ON for the duration of the blanking time.

Figure 4:
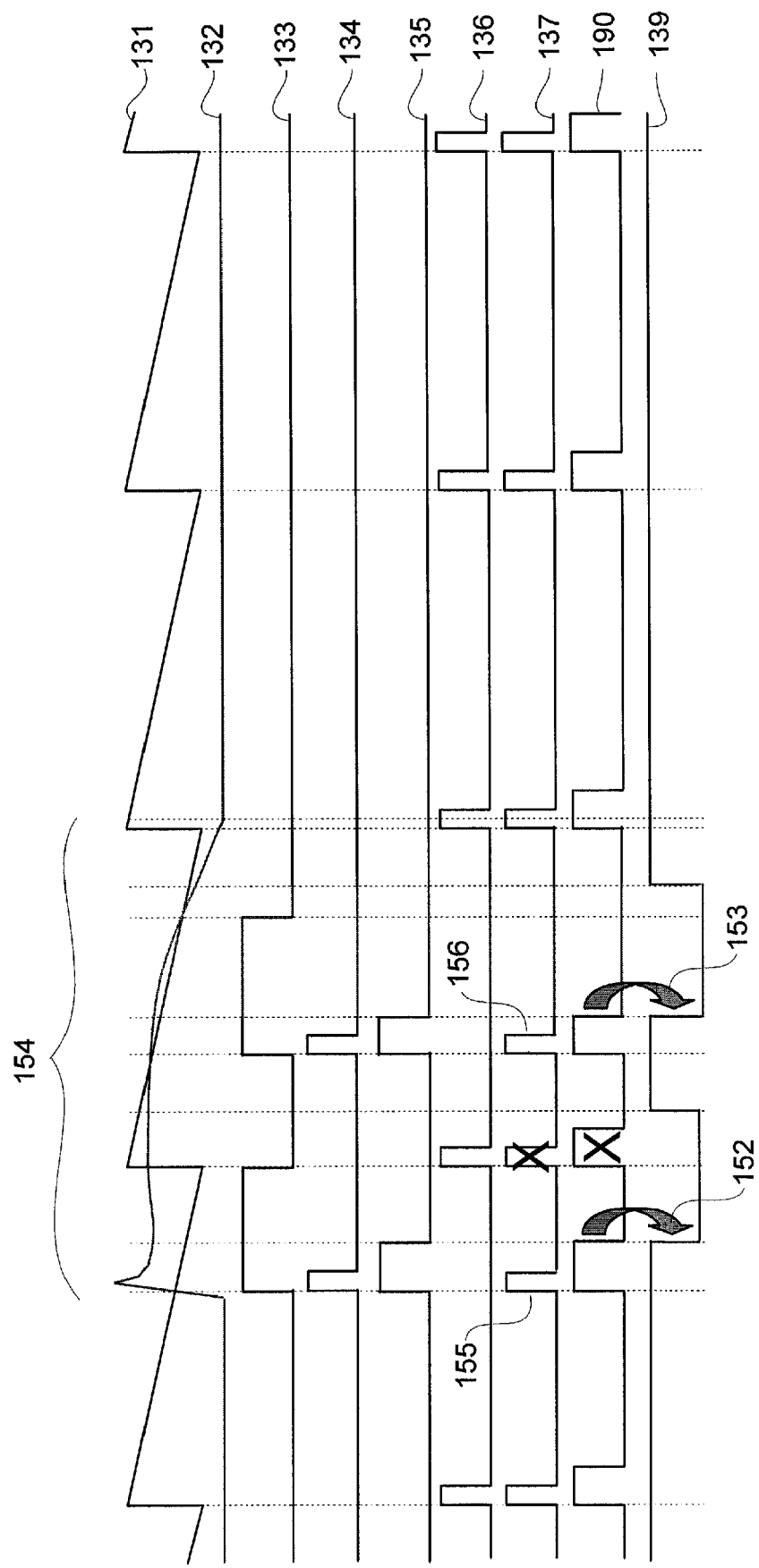
FIG. 4 shows timing diagrams of the dynamic load current detection and non-linear control block of FIG. 3.

FIG. 4 shows timing diagram at nodes 131-137, 139 and 190 of the dynamic load current detection and non-linear control circuit block 124 of FIG. 3. The label of each of the waveforms in FIG. 4 corresponds to the same labeled node in FIG. 3. In the example of FIG. 4, the dynamic load current detector 112 detects that the load current steps-up at a high slew rate, resulting in the signal at the node 132 being higher than the signal VREFT at the node 131 in two instances (see 154). This results in the comparator 143 generating two pulses at the node 133, which trigger the one-shot circuit 144 to generate two pulses at the node 134. The linear clock signal CLK at the node 136 periodically sends clock pulses at this time. Because the output of the one-shot circuit 144 and the linear clock signal CLK are in a logical OR, the one-shot circuit 144 and the linear clock signal CLK would have generated SCLK pulses that may be very close to each other. Advantageously, the duty cycle blanking circuit 148 generates a blanking signal at the falling edge of the PWM signal (see 152 and 153). The blanking signal prevents the extraneous one-shot at node 134 (non-linear control clock) or CLK pulse from being generated (labeled as "X" on pulse at node 137), preventing the SR flip-flop 101 from turning ON the top switch. This also prevents the PWM signal from inserting another pulse right after the top switch turns OFF (labeled as "X" on pulse at node 190). From FIG. 4, the additional pulses 155 and 156 of the signal SCLK at the node 137 are responsive to the load current step-up change, allowing the top switch to be turned ON in between pulses of the linear clock signal CLK.

Figure 5:
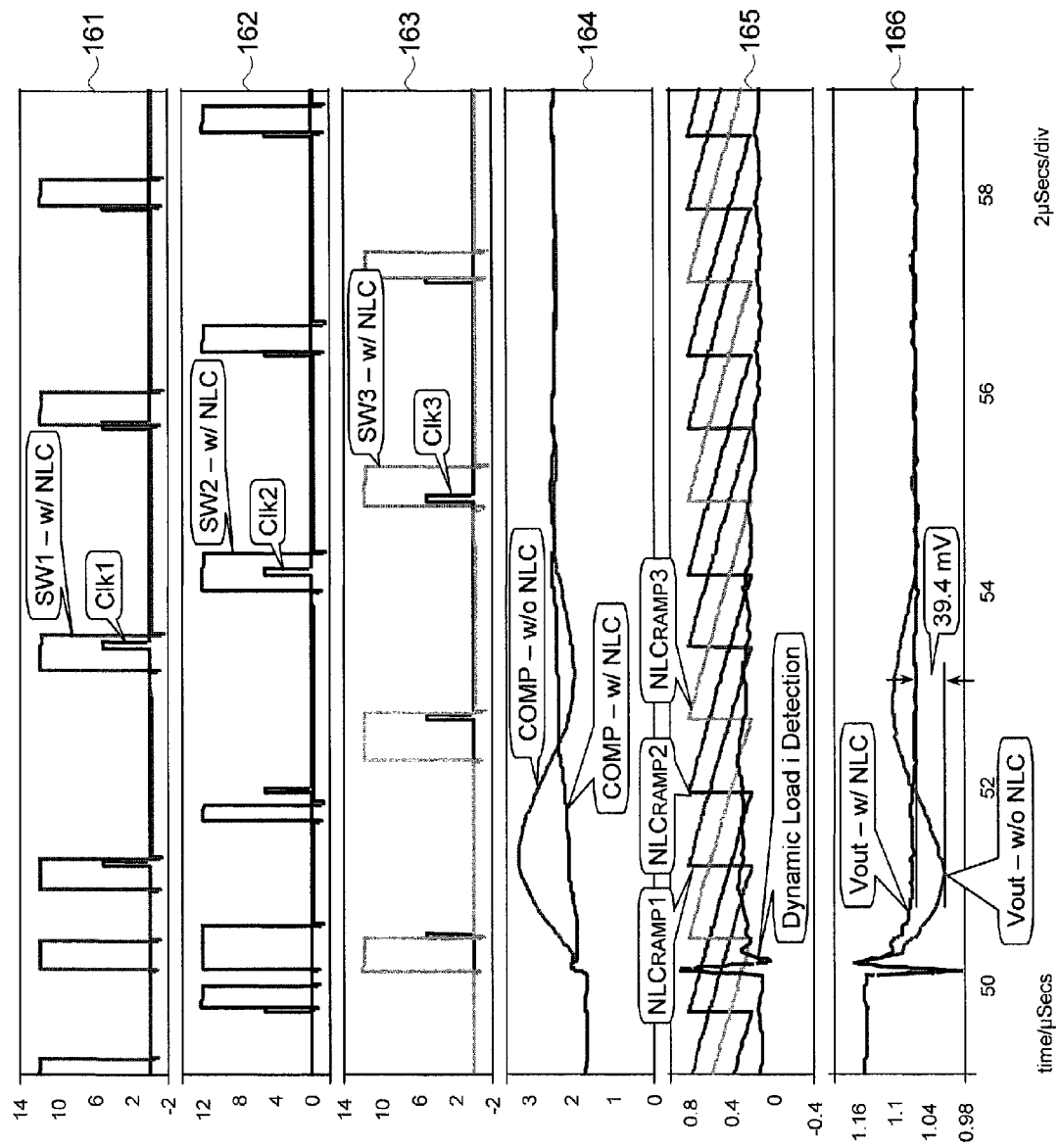
FIG. 5 shows example waveforms of signals in the voltage regulator of FIG. 1.

FIG. 5 shows example waveforms 161-166 in the voltage regulator 100. In the waveforms 161-166, the horizontal axis represents time in microseconds, while the vertical axis represents signal value in volts. The waveforms 161-166 illustrate a load current step-up transient response from 35 A to 130 A at 50 ns in a 3-phase voltage regulator.

The waveforms 161 show a linear clock signal CLK1 and a signal at the switch node SW1 with non-linear control for a first output phase block 110. The "1" after "CLK" and "SW" indicate an item for the first phase. That is, the linear clock signal CLK1 is the linear clock signal CLK shown in FIG. 2 for a first phase, and SW1 indicates the switch node SW shown in FIG. 2 for the first phase. The switch node SW for each phase is between the switches S1 and S2. Similarly, the waveforms 162 show a linear clock signal CLK2 and a switch signal SW2 of a second output phase block 110, the waveforms 163 show a linear clock signal CLK3 and a switch signal SW3 of a third output phase block 110.

The waveforms 164 show the comparison signal COMP at the node 127 of the error amplifier 123 (see FIG. 2) with and without using non-linear control (NLC). The waveforms 165 show non-linear control ramps for the first, second, and third phases, which are labeled as "NLCRAMP1," "NLCRAMP2," and "NLCRAMP3", respectively. The waveforms 165 also show the output of the dynamic load current detector 112. As explained, a non-linear control ramp at a node 131 is compared to the output of the dynamic load current detector 112 at a node 132 (see FIG. 3) to detect fast load current step-up change. A pulse at a switch node SW (indicating turning ON of the top switch) is triggered by the non-linear control 108 when the output of the dynamic load current detector 112 at the node 132 is greater than a corresponding non-linear control ramp NLCRAMP at node 131. The waveforms 166 show the output voltage VOUT of the regulator 100 with and without non-linear control. Notice that without using non-linear control, the output voltage may undershoot by as much as 39.4 millivolts in this example.

Load Release Dip Control

Figure 6:
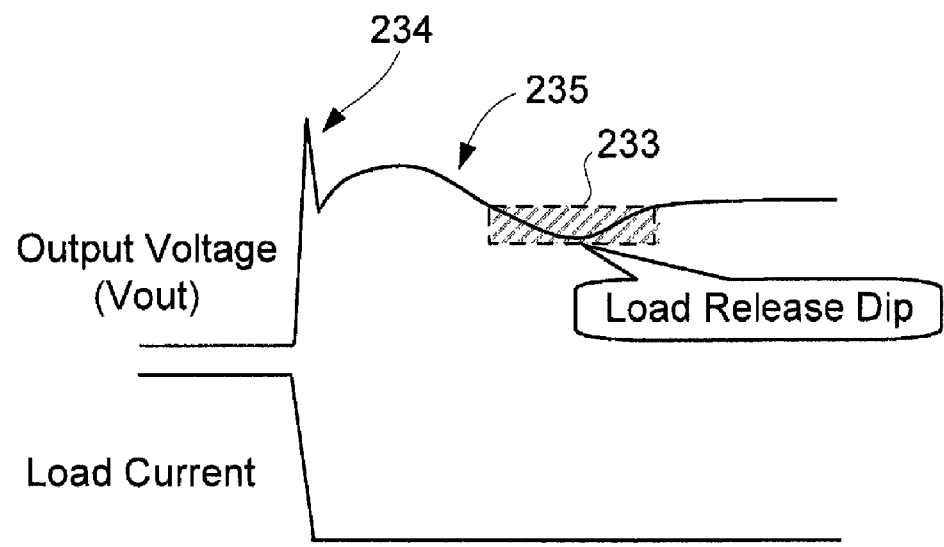
FIG. 6 schematically illustrates output voltage load release dip.

Load release dip may occur when the load current changes from high load to low load. Generally speaking, load release dip is a decrease in an oscillating output voltage that is well below a regulated voltage level. Load release dip is illustrated in FIG. 6 (see 233) where the output voltage VOUT dips just before steady state after the load current changes from high load to low load. For example, in FIG. 6, the spike (see 234) in the output voltage VOUT may be due to initial charging of an output multi-layer ceramic capacitor (MLCC). This spike may not be detectable by components of the system because of its relatively short duration (e.g., less than 100 ns). More problematic is the follow on transitions (see 235 and 233), which are due to inductor current slew rate limitation and linear control circuit limitation. These transitions are of much longer duration than the spike, and are detectable by components of the system, such as a microprocessor. A voltage regulator with load release dip control is now explained beginning with FIG. 7.

Figure 7:
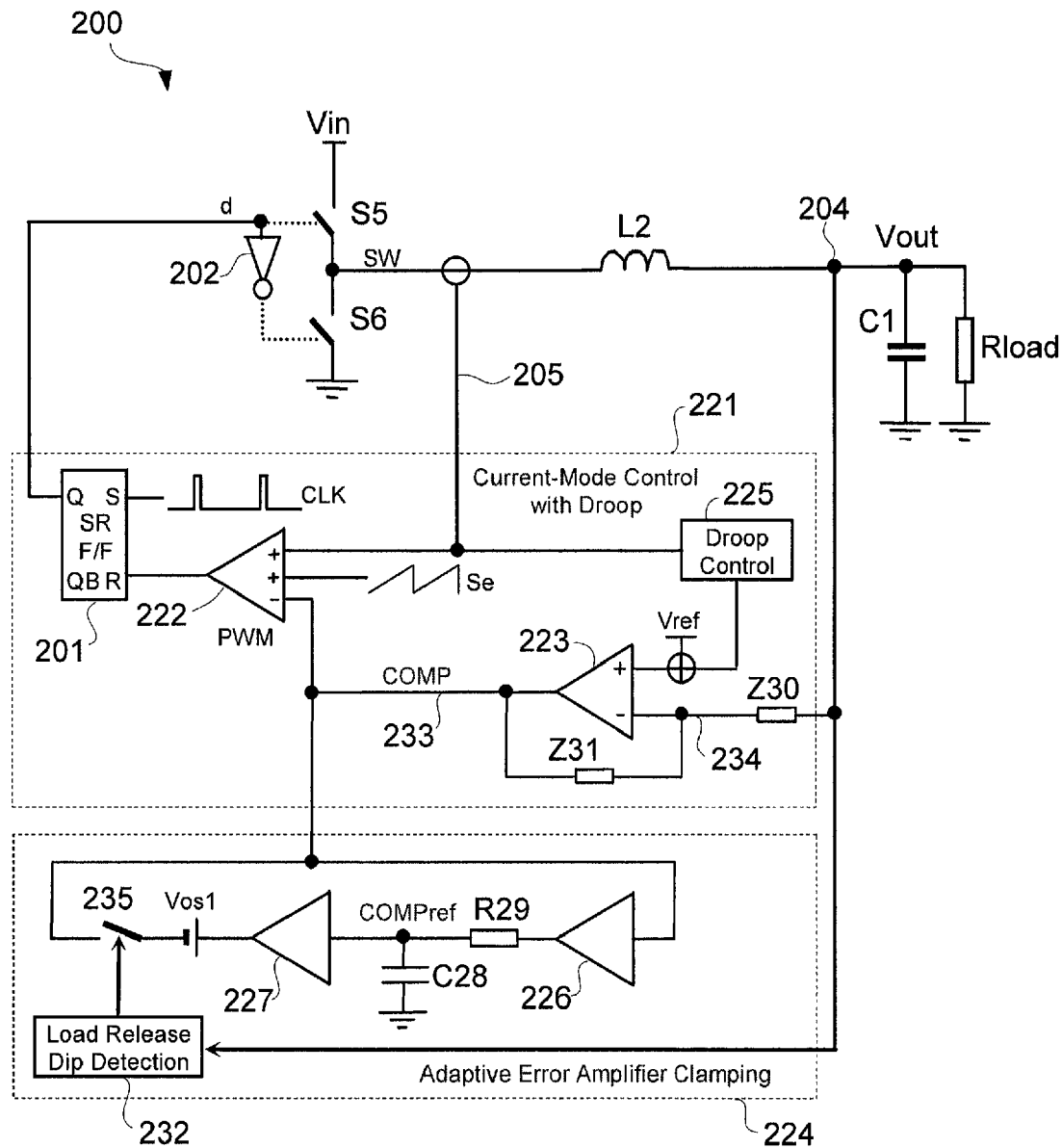
FIG. 7 schematically shows a voltage regulator in accordance with another embodiment of the present invention.

FIG. 7 schematically shows a voltage regulator 200 in accordance with an embodiment of the present invention. The voltage regulator 200 may have multiple phases but only one is shown for clarity of illustration.

In the example of FIG. 7, the switches S5 and S6 represent synchronously switched transistors (e.g., MOSFET). An inverter 202 allows the switch S6 to be OFF when the switch S5 is turned ON, and to be ON when the switch S5 is turned OFF. The switch S5, also referred to as the "top transistor" or "top switch," is turned ON to allow the input power supply providing the input voltage VIN to charge the output capacitor C1 and source current to the load Rload through the output inductor L2. The switch S5 is turned OFF to stop delivering current to the output capacitor C1 and the load Rload. By controlling the switching of the switches S5 and S6, the output voltage VOUT across the load Rload at the node 204 can be maintained within regulation.

In the example of FIG. 7, a linear control circuit 221 controls the switching of the switches S5 and S6 using peak current mode control. The current loop of the current mode control is by way of the path 205, which may include a lossless current sense circuit (not shown) to sense inductor current flowing through the output inductor L2. The voltage loop of the current mode control is by way of the path starting from the input impedance network Z30 of the voltage error amplifier 223. The gain of the error amplifier 223 is governed by the ratio of the impedance network Z31 to the input impedance, network Z30. As will be more apparent below, the feedback signal FB at the input node 234 of the error amplifier 223 may be compared to the output voltage VOUT on the other side of the input impedance network Z30 to detect load release dip.

The linear control circuit 221 generates a linear clock signal CLK to periodically set an SR flip-flop 201, and thereby periodically turn ON the switch S5. The error amplifier 223 compares the feedback voltage on the node 234 to a reference voltage VREF to control the output voltage VOUT within its regulation band. A PWM comparator 222 compares the sensed inductor current plus an external ramp signal (labeled as "Se") and the comparison signal COMP at the node 233 to control turning OFF of the switch S5.

In the example of FIG. 7, the linear control circuit 221 includes a droop control circuit 225. The droop control circuit 225 is configured to make the output voltage VOUT inversely proportional to the load current. In one embodiment, the droop control circuit 225 is configured to do so by adjusting the reference voltage VREF based on the load current. For example, the droop control circuit 225 may lower the reference voltage VREF at high load currents, and increase the reference voltage VREF at low load currents.

The voltage regulator 200 further includes an adaptive error amplifier clamping (AEAC) circuit 224 for controlling load release dip. When the output voltage VOUT is much higher than the reference voltage VREF, such as when a large load release occurs, the comparison signal COMP output of the error amplifier 223 will be very low and may even go to saturation. In that case, due to limited control bandwidth, the error amplifier 223 may not be able to quickly change its output in response to a subsequent change in the output voltage VOUT. The AEAC circuit 224 adaptively clamps the output of the error amplifier 223 to a predetermined level in the event of a load release dip situation to advantageously allow the error amplifier 223 to quickly recover.

Clamping the output of the error amplifier 223 is relatively easy to implement in a voltage-mode control circuit. However, this is not the case with current-mode control circuits, such as the linear control circuit 221. In a current-mode control circuit, current information is used to control the switching of the top and bottom switches. Therefore, the output of the error amplifier 223 cannot be simply clamped to a certain level with varying load current, since the comparison signal COMP voltage is load current dependent. In the example of FIG. 7, the AEAC circuit 224 includes a load release dip detection circuit 232 to adaptively clamp the output of the error amplifier 223 upon detection of a load release dip.

The AEAC circuit 224 includes a buffer 226 that receives the comparison signal COMP output of the error amplifier 223. A filter circuit comprising a resistor R29 and a capacitor C28 creates a delay that develops a reference signal COMPref, which is added to an offset voltage Vos1 by way of a buffer 227. The reference signal COMPref plus the offset voltage Vos1 represent a clamped comparison signal COMP, which is presented to the input of the PWM comparator 222 when the load release dip detection circuit 232 closes a switch 235 upon detection of a load release dip.

Figure 8:
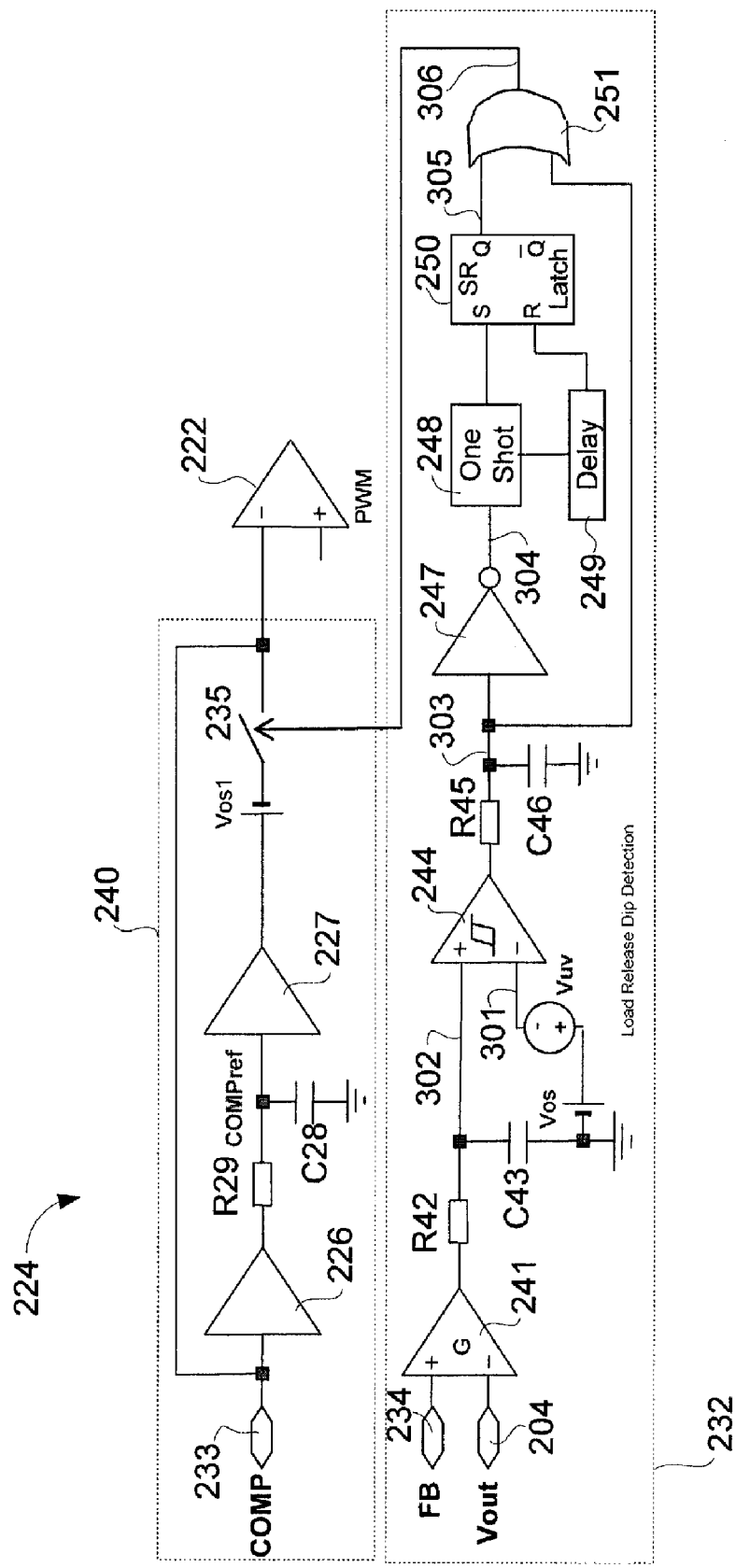
FIG. 8 schematically shows additional details of an adaptive error amplifier clamping (AEAC) circuit in accordance with an embodiment of the present invention.

FIG. 8 schematically shows additional details of the AEAC circuit 224 in accordance with an embodiment of the present invention. Similar to the dynamic load current detector 112 of FIG. 3, the load release dip detection circuit 232 includes an amplifier 241 that compares the feedback signal FB at the node 234 (see also FIG. 7) to the output voltage VOUT at the node 204. As previously explained, the difference between the feedback signal FB and the output voltage VOUT is indicative of change in load current. The larger the change in load current, the larger the difference. The output of the amplifier 241 is filtered by a filter formed by a resistor R42 and a capacitor C43. A comparator 244 compares the load current change information with a predetermined reference voltage Vuv to determine if the load step-down change is large enough to cause a load release dip. An offset voltage VOS allows the reference signal Vuv to be adjusted for optimization. If the change in load current is large enough to cause a load release dip, the amplifier 244 outputs a control signal that is filtered by a filter formed by a resistor R45 and a capacitor C46 and triggers a one-shot circuit 248 after an inverter 247 to generate a pulse, which in turn sets an SR flip-flop 250 to close the switch 235 by way of the OR gate 251. A delay circuit 249 delays an output of the one-shot circuit 248 to reset the SR flip-flop 250 after the one-shot 248 is triggered to blank out noise and other extraneous pulses. Closing the switch 235 clamps the comparison signal COMP for input to the PWM comparator 222. The operation of the components in the block 240 has been previously described with reference to FIG. 7.

Figure 9:
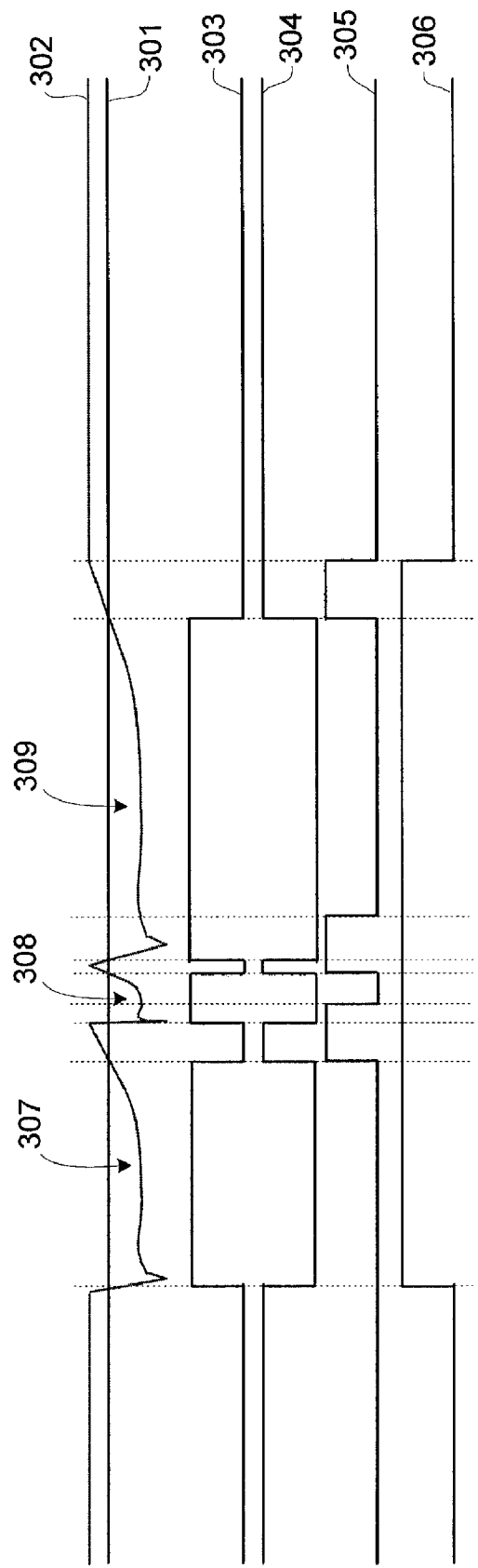
FIG. 9 shows a timing diagram at various nodes of the AEAC circuit of FIG. 8.

FIG. 9 shows a timing diagram at nodes 301-306 of the AEAC circuit 224. The waveforms of FIG. 9 are not to scale. The label of each of the waveforms in FIG. 9 corresponds to the same labeled node in FIG. 8. In the timing diagram of FIG. 9, the comparator 244 detected load current step changes (see 307, 308, and 309), which are sufficiently large enough to result in a load release dip. The resulting signal at the node 303 is ORed with the blanking signal at the node 305, resulting in a continuous pulse at the node 306. This pulse is presented to the switch 235 to clamp the comparison signal COMP to control the load release dip.

Figure 10:
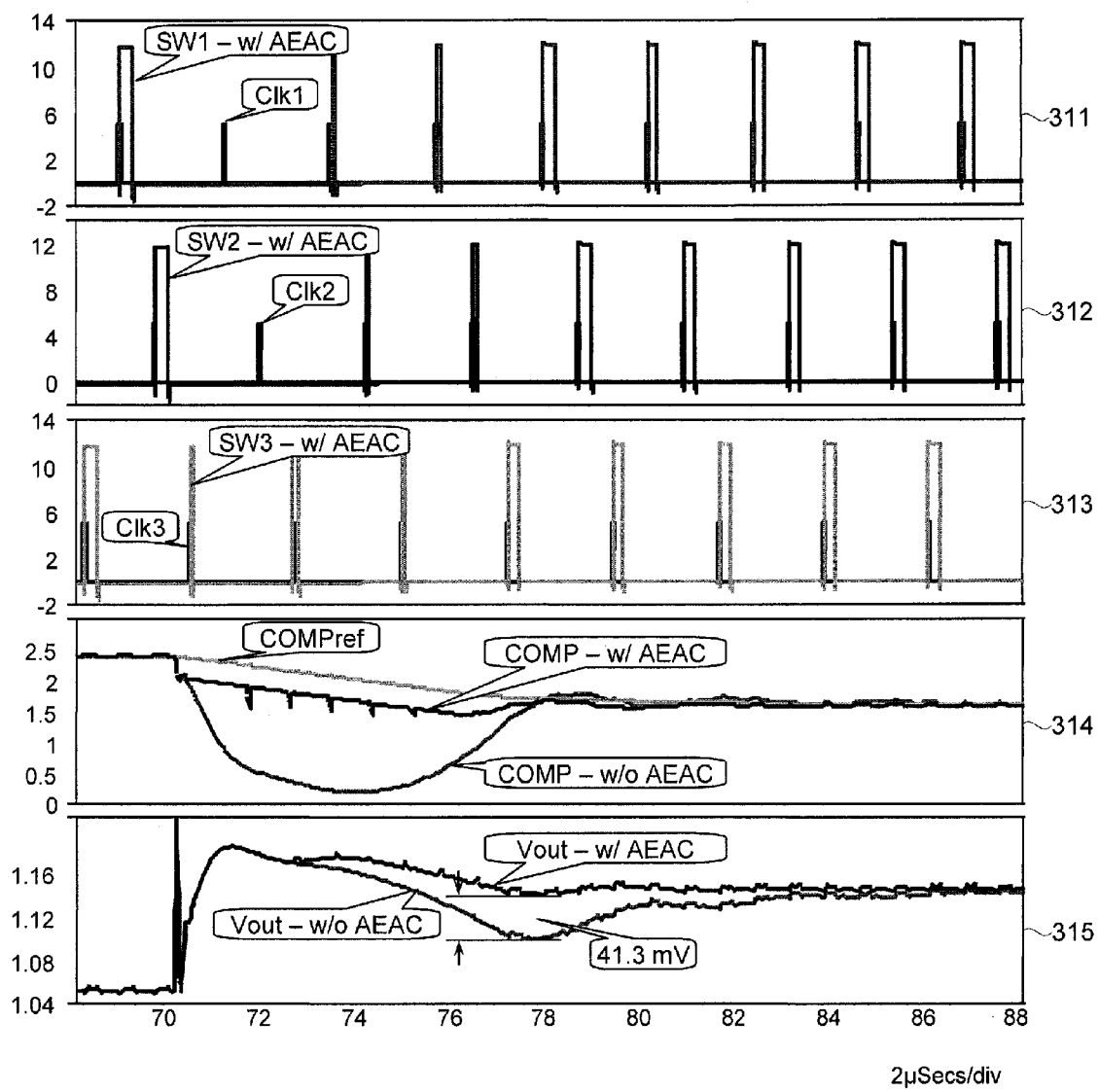
FIG. 10 shows simulation waveforms in the voltage regulator of FIG. 7.

FIG. 10 shows simulation waveforms 311-315 in the voltage regulator 200. In the simulation waveforms 311-315, the horizontal axis represents time in microseconds, while the vertical axis represents signal value in volts. The simulation waveforms 311-315 simulate a load current step-down change from 130 A to 35 A at 50 ns.

Simulation waveforms 311-313 show a linear clock signal CLK and a signal at the corresponding switch node SW for a voltage regulator 200 with three phases. In the simulation waveforms 311, the "1" after "CLK" and "SW" indicate an item for the first phase. That is, the linear clock signal CLK1 is the linear clock signal CLK shown in FIG. 7 for a first phase, and SW1 indicates the switch node SW shown in FIG. 7 for the first phase. The switch node SW for each phase is between the switches S5 and S6. Similarly, the simulation waveforms 312 shows a linear clock signal CLK2 and a switch signal SW2 of a second phase, the simulation waveforms 313 show a linear clock signal CLK3 and a switch signal SW3 of a third phase. As can be appreciated, the voltage regulator 200 may be configured with one or several phases depending on the application.

The simulation waveforms 314 show the comparison signal COMP with AEAC versus the reference signal COMPref and a comparison signal COMP without AEAC. The timing diagram 315 shows the resulting output voltage VOUT with and without AEAC. As shown in the simulation waveforms 315, use of AEAC advantageously controls output voltage load release dip, which may be as much as 41.3 mV below regulation voltage in this example.

Ring-Back Control

Figure 11:
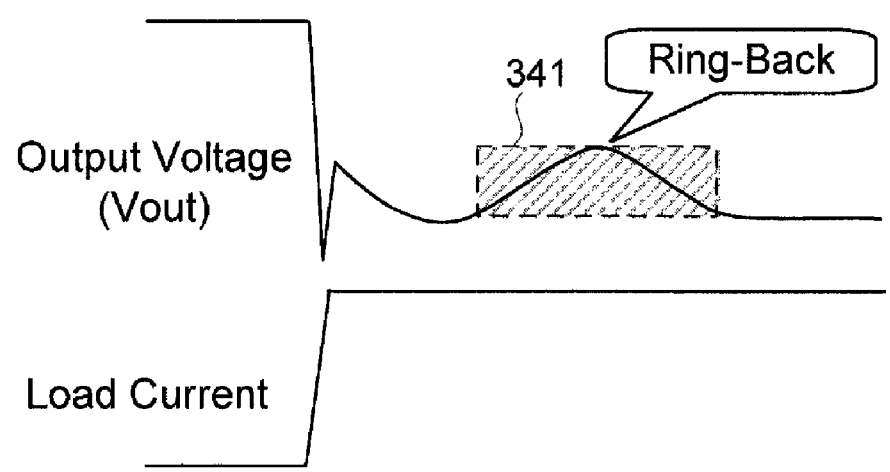
FIG. 11 schematically illustrates output voltage ring-back.

Ring-back of the output voltage VOUT may occur when turning ON multiple top switches in multi-phase voltage regulators that use a non-linear control scheme. Generally speaking, output voltage ring-back is an increase in an oscillating output voltage VOUT well above a regulated steady state voltage level that typically happens in the first couple of microseconds of a fast load current step-up change. The ring-back is believed to be due to the extra charge being delivered to the load by the multiple top switches when non-linear control is initiated. FIG. 11 shows an example ring-back on the output voltage VOUT (see 341) before steady state. In the example of FIG. 11, the large change in load current triggers a non-linear control circuit (e.g., NLC circuit 108 of FIG. 1) to insert additional pulses to turn ON a corresponding top switch. With multiple phases, there may be several top switches that are turned ON by the non-linear control circuit, resulting in ring-back in some situations. Ring-back control is an optional scheme and may or may not be employed depending on implementation details.

Figure 12:
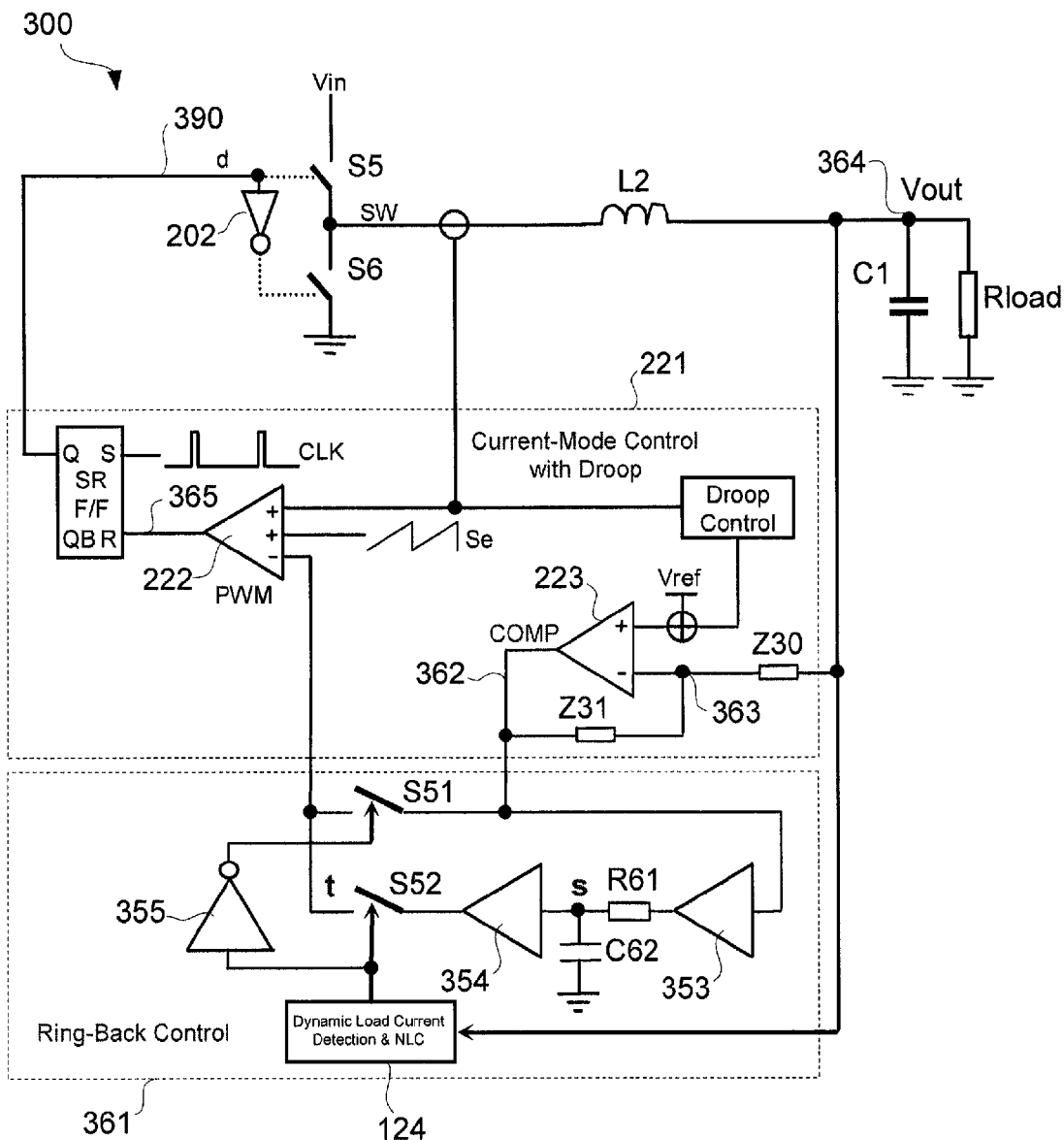
FIG. 12 shows a voltage regulator in accordance with another embodiment of the present invention.

FIG. 12 shows a voltage regulator 300 in accordance with an embodiment of the present invention. The regulator 300 may have multiple phases but only one is shown in FIG. 12 for clarity of illustration. In the example of FIG. 12, the regulator 300 may include a linear control circuit 221 to control the switches S5 and S6 to maintain the output voltage VOUT at the node 364 within regulation. The operation of the linear control circuit 221 in relation to the switch S5, switch S6, inverter 202, output inductor L2, output capacitor C1, and load Rload is the same as described with reference to FIG. 7.

The regulator 300 includes a ring-back control circuit 361 configured to control output voltage ring-back. The ring-back control circuit 361 may include a dynamic load current detection and non-linear control block 124. The block 124 allows for non-linear control during large variations in load current as previously explained with reference to FIG. 2. In the example of FIG. 12, the block 124 is further employed to control the switches S51 and S52 to control ring-back during non-linear control operation.

In one embodiment, the ring-back control circuit 361 reduces PWM ON time by using a cycle-by-cycle controlled slow comparison signal "s" (see input of the buffer 354) to reduce the energy delivered to the load Rload during non-linear control. In operation, the ring-back control circuit 361 receives the comparison signal COMP at the input of the buffer 353. The filter comprising the resistor R61 and the capacitor C62 is configured to slow the comparison signal COMP to develop the slow comparison signal at the input of the buffer 354. The slow comparison signal s time constant may be internally fixed by appropriate selection of the values of the resistor R61 and the capacitor C62.

The block 124 initiates non-linear control operation upon detection of high load current step-up change with high slew rates. When that occurs, i.e., during non-linear control, a control signal developed from the block 124 closes the switch S52. The switch S51 is open due to the inversion of the signal by the inverter 355. Note that the inverter 355 is for schematic representation only. As will be more apparent below, two separate signals may be used to control the opening and closing of the switches S51 and S52.

When the switch S52 is closed, the slow comparison signal s (instead of the comparison signal COMP) is presented to the input of the PWM comparator 222. This controls the ON time of the PWM signal at the node 365, which controls how long the top switch S5 is turned ON to reduce the amount of energy delivered to the load Rload to control ring-back. The ON time of the PWM signal may be partially adjusted by changing compensation parameter components (e.g., impedance networks Z30 and Z31) of the error amplifier 223 and/or by changing the gain of the current sense amplifier (not shown) of the current mode control loop to adjust the slope of the sensed current ramp.

During linear control, a signal from the block 124 opens the switch S52 and closes the switch S51 to allow the comparison signal COMP (instead of the slow comparison signal s) to be provided to the PWM comparator 222.

Figure 13:
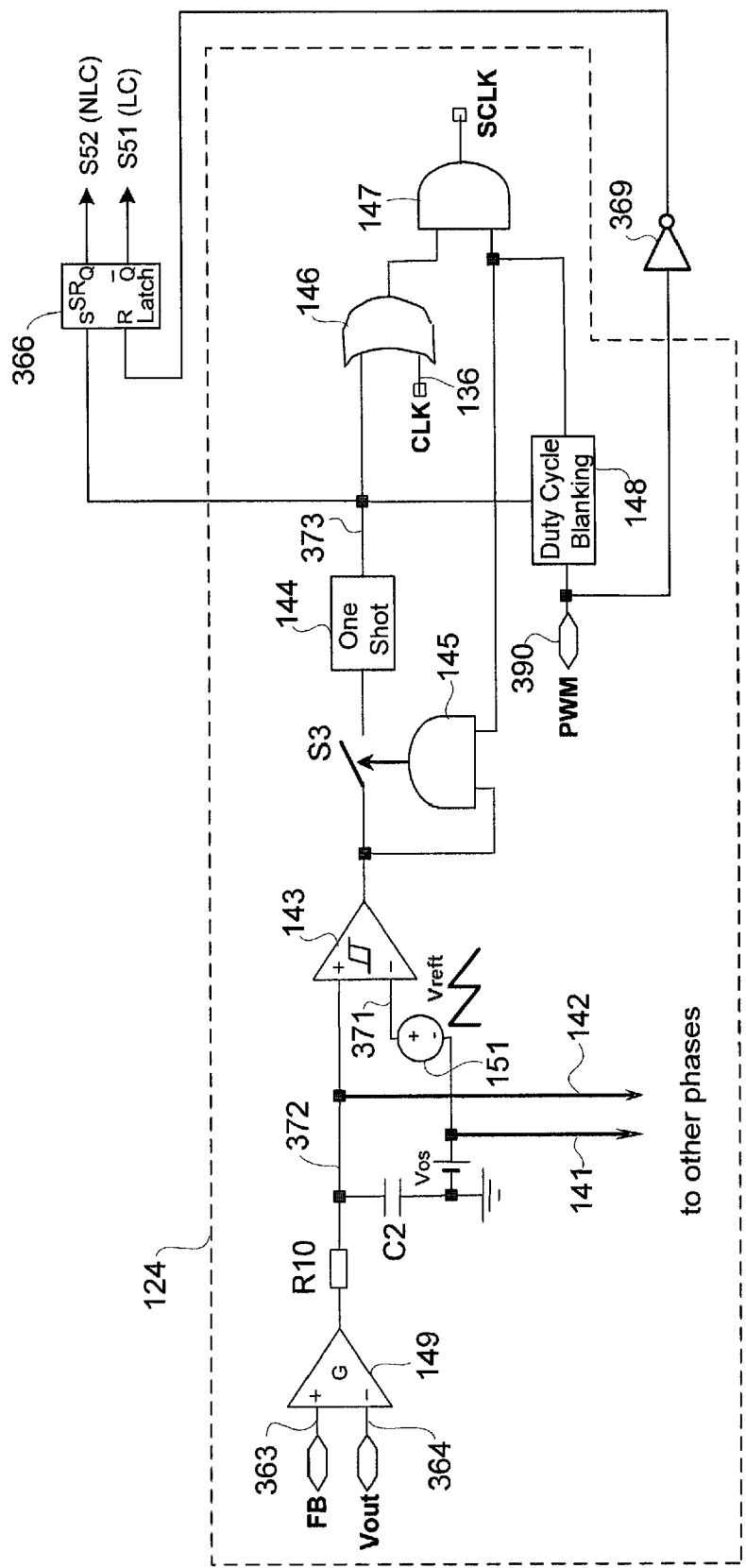
FIG. 13 schematically shows a ring-back control circuit in a dynamic load current detection and non-linear control circuit, in accordance with an embodiment of the present invention.

FIG. 13 schematically shows the use of the dynamic load current detection and non-linear control block 124 in the ring-back control circuit 361, in accordance with an embodiment of the present invention. The operation of the block 124 and its components and signals have been explained with reference to FIG. 3. In the example of FIG. 13, the block 124 receives the feedback signal FB at a node 363 and the output voltage at a node 364. The PWM signal is at a node 390. These nodes are also shown in FIG. 12.

To control output voltage ring-back, the output of the one-shot circuit 144 is provided to the set input of an SR flip-flop 366. When in non-linear control, the one-shot circuit 144 outputs a pulse at the node 373 to set the SR flip-flop 366, which controls the switch S52 (see FIG. 12). This allows the switch S52 to be closed during non-linear control operation, providing the slow comparison signal s to the PWM comparator 222 to control ring-back. The PWM signal at the node 390 is connected to the reset input of the SR flip-flop 366 through an inverter, which controls the switch S51. During linear control, the PWM signal at the node 390 resets the SR flip-flop 366 through an inverter 369 to close the switch S51 and thereby provide the comparison signal COMP to the PWM comparator 222.

Figure 14:
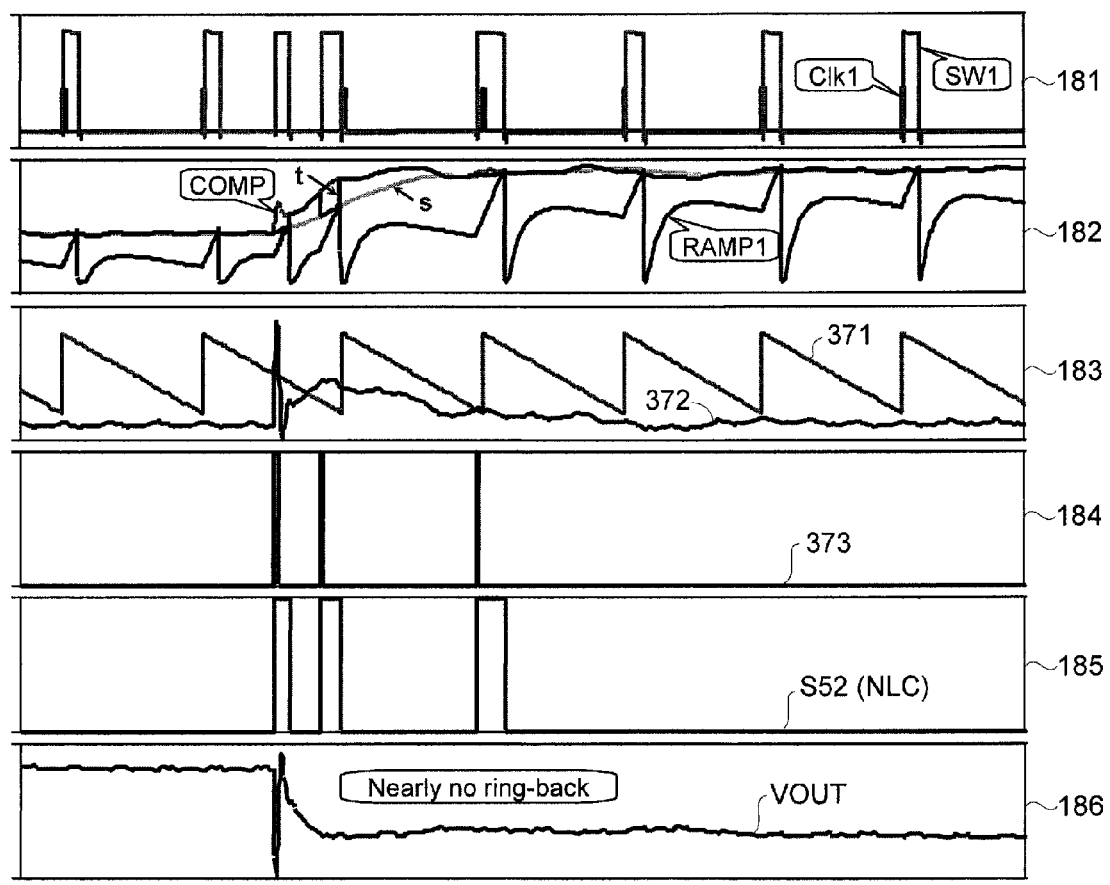
FIG. 14 shows timing diagrams showing signals of the voltage regulator of FIG. 12 in accordance with an embodiment of the present invention.

FIG. 14 shows timing diagrams 181-186 showing signals of the voltage regulator 300 in accordance with an embodiment of the present invention. The timing diagrams 181-186 show signals for one phase of a multi-phase regulator 300.

Timing diagrams 181 and 182 show a linear clock signal CLK, a signal at the corresponding switch node SW, and current ramp signal RAMP that is the sum of sensed inductor current rising slope plus an external ramp slope ("Se" in FIG. 12) for the voltage regulator 300. In the timing diagram 181, the "1" after "CLK" and "SW" indicate an item for the first phase. That is, the linear clock signal CLK1 is the linear clock signal CLK shown in FIG. 12 for a first phase, and SW1 indicates the switch node SW shown in FIG. 12 for the first phase. Similarly, the RAMP1 signal in the timing diagram 182 is the current ramp signal for the first phase. As can be appreciated, the voltage regulator 300 may be configured with one or several phases depending on the application.

The timing diagram 182 shows the relationship between the comparison signal COMP, the slow comparison signal s, cycle-by-cycle clamped comparison COMP signal t, and the ramp signal RAMP1. The timing diagram 183 shows signals at the nodes 371 and 372 of the block 124 of FIG. 13, illustrating detection of a load current step-up change. The timing diagram 184 show the resulting output pulse of the one-shot circuit 144 at the node 373, while the timing diagram 185 shows the resulting control signal to close the switch S52. The timing diagram 186 shows the output voltage VOUT, which exhibit essentially no ring-back despite multi-phase non-linear control of the voltage regulator 300.

Overshoot Control

Figure 15:
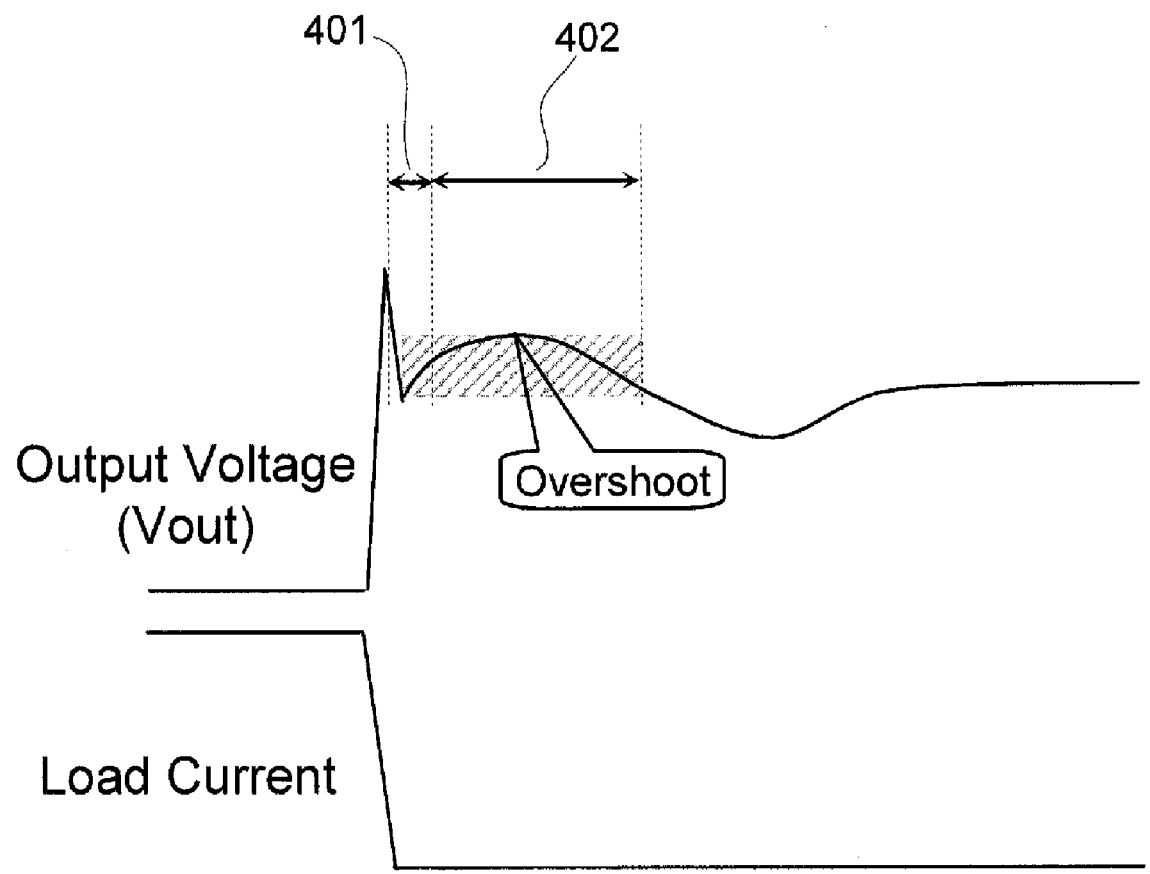
FIG. 15 schematically illustrates output voltage overshoot.

The output voltage VOUT may overshoot upon a load current step-down change, especially at high load current slew rates. This is schematically illustrated in FIG. 15 where the load current step-down change results in the output voltage VOUT spiking well above the regulated voltage, goes down, then overshoots the regulated voltage on the way back up. Although the output voltage VOUT eventually settles at steady state, the overshoot may violate the upper regulation tolerance band. Conventional approaches to controlling overshoot typically involve detecting zero-crossing of the inductor current, which may be too late in some applications. That is, conventional overshoot control attempts to detect and address the portion of the overshoot labeled in FIG. 15 as 402, which happens after the overshoot has already partially occurred.

In contrast, embodiments of the present invention detect the portion of the overshoot labeled in FIG. 15 as 401. This advantageously allows for detection and control of the overshoot before the zero-crossing of the inductor current and before the output voltage fully builds up to overshoot. In one embodiment, this is performed by dynamically detecting the load current step change and turning OFF the top switch (i.e., the transistor switching the input voltage VIN) before the load current becomes zero.

Figure 16:
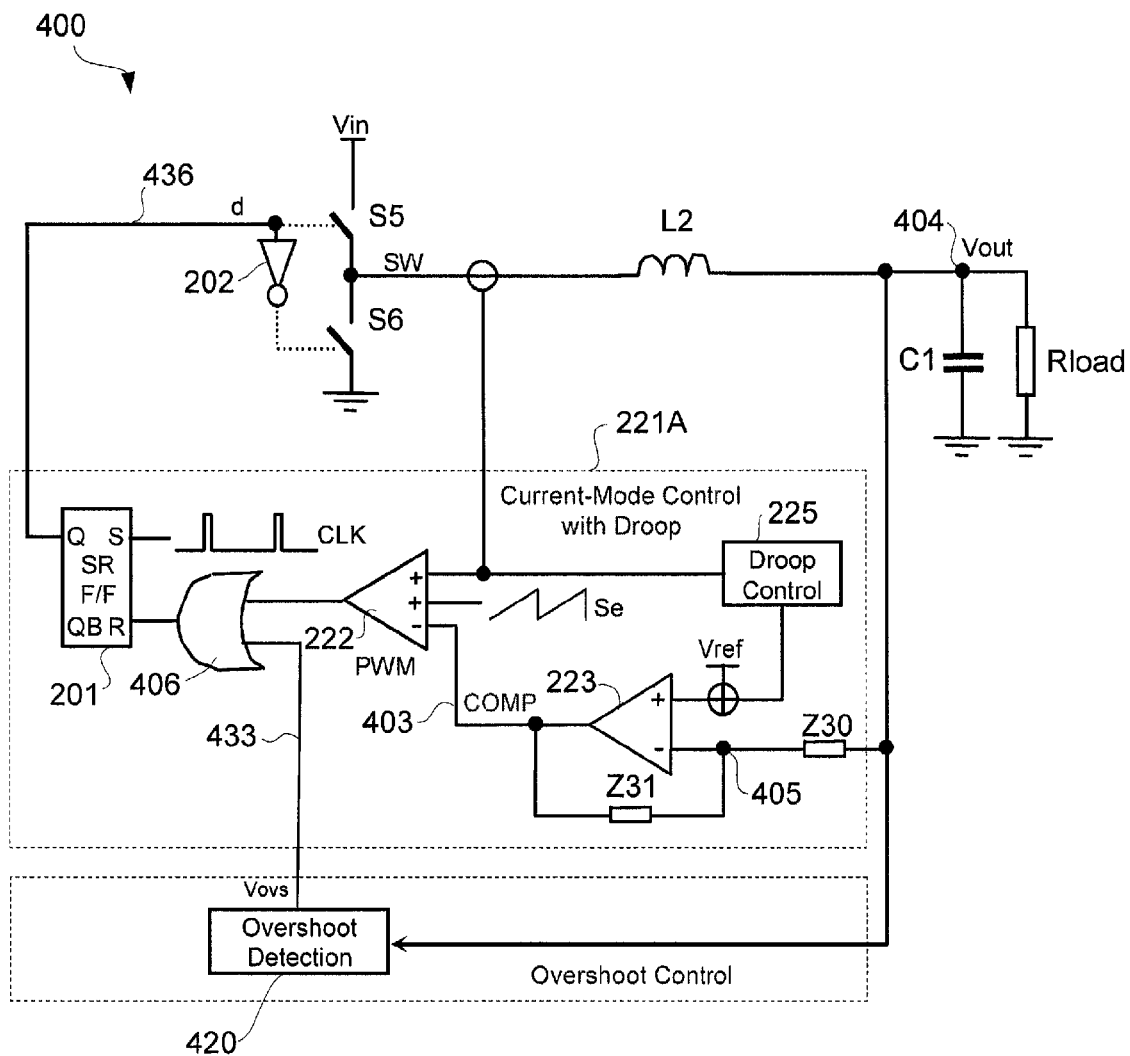
FIG. 16 schematically shows a voltage regulator in accordance with another embodiment of the present invention.
Figure 20:
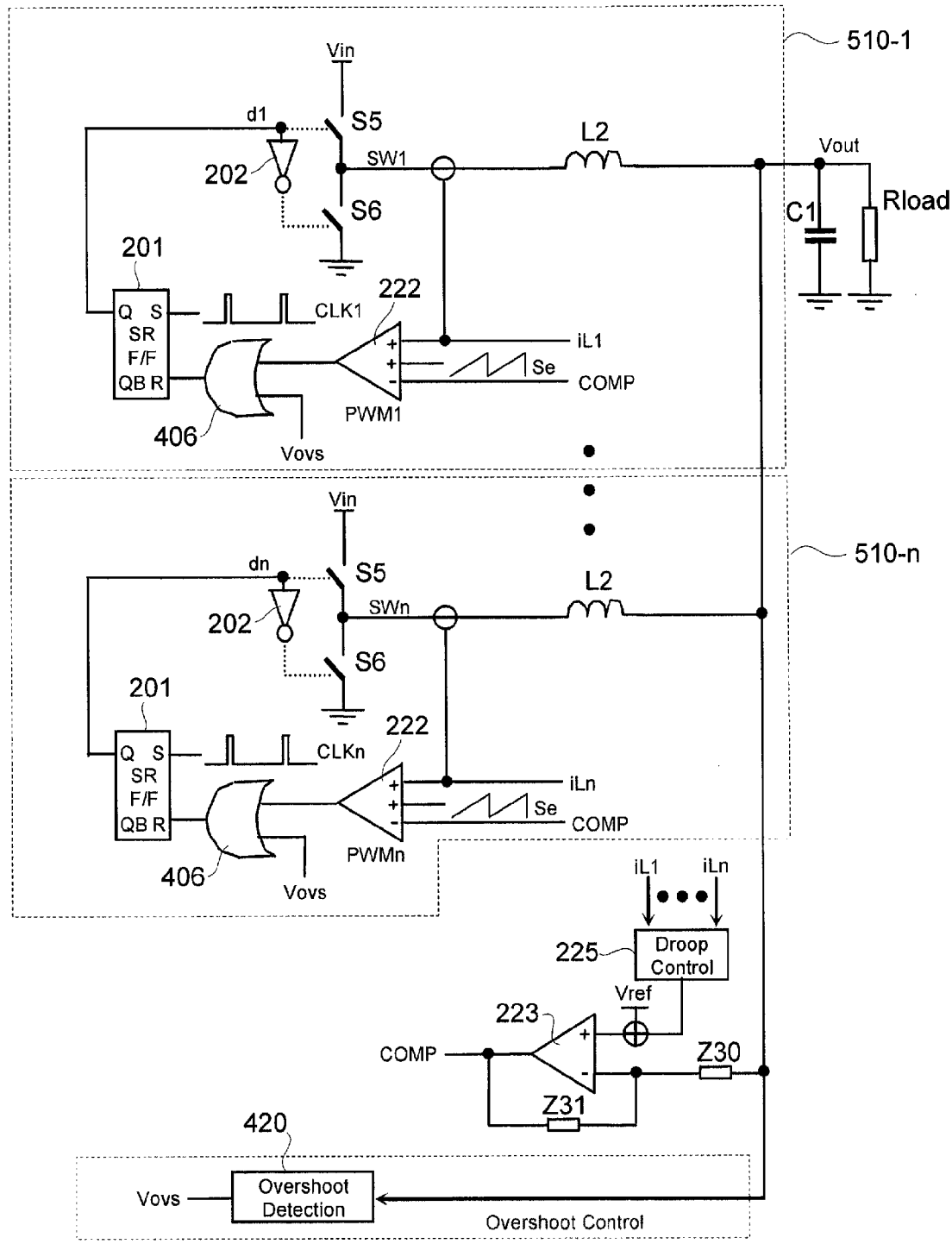
FIG. 20 shows the difference phases of the regulator of FIG. 16 in accordance with an embodiment of the present invention.

FIG. 16 schematically shows a voltage regulator 400 in accordance with an embodiment of the present invention. The regulator 400 may have multiple phases but only one is shown in FIG. 16 for clarity of illustration. An example regulator 400 configured with multiple phases is shown in FIG. 20.

In the example of FIG. 16, the regulator 400 includes a linear control circuit 221A to control the switches S5 and S6 to maintain the output voltage VOUT at the node 404 within regulation. The linear control circuit 221A is the same as the linear control circuit 221 shown in FIGS. 7 and 12 except for the addition of an OR gate 406 to allow for insertion of an overshoot control voltage VOVS at the node 433. In one embodiment, the overshoot control voltage VOVS is generated by an overshoot detection circuit 420 upon detection of a load current step-down change. The overshoot control voltage VOVS is provided to the reset input of the SR flip-flop 201 to turn OFF the top switch S5 (and turn ON the switch S6), thus preventing overcharging of the output capacitor C1 to control output voltage overshoot. The operation of the linear control circuit 221A in relation to the switch S5, switch S6, inverter 202, output inductor L2, output capacitor C1, and resistor Rload is otherwise the same as the linear control circuit 221 described with reference to FIG. 7.

Figure 17:
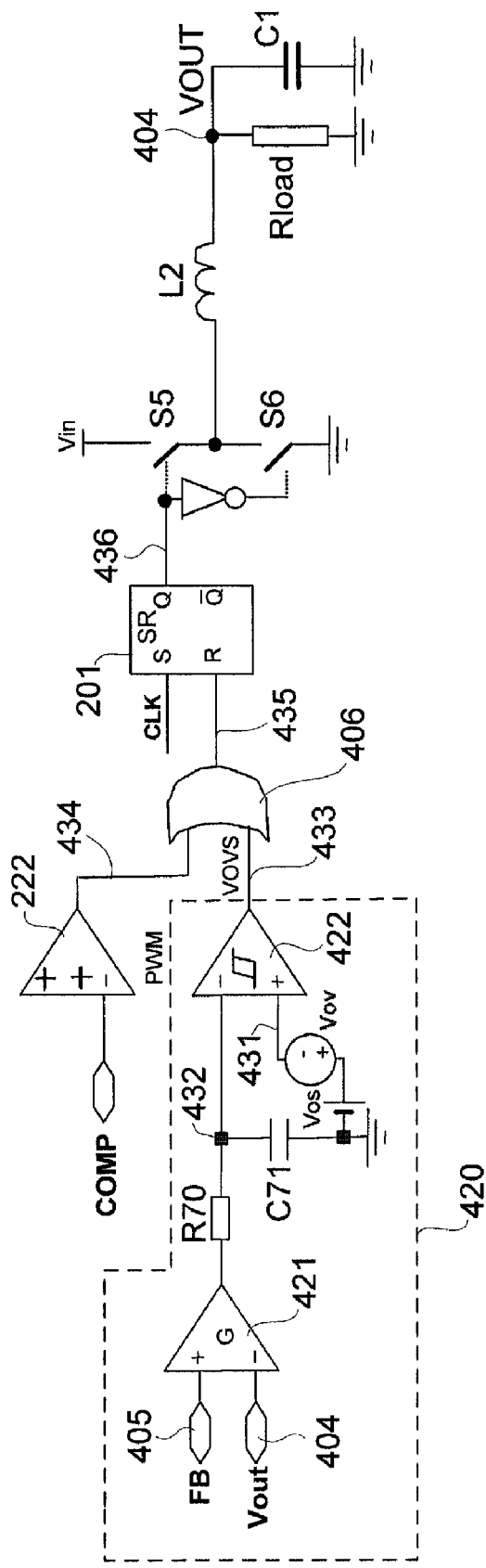
FIG. 17 schematically shows details of an overshoot detection and control circuit in accordance with an embodiment of the present invention.

FIG. 17 schematically shows details of the overshoot detection circuit 420 in accordance with an embodiment of the present invention. In the example of FIG. 17, the overshoot detection circuit 420 allows for overshoot control by generating the overshoot control voltage VOVS at the node 433 upon detection of a load current step-down change. The overshoot control voltage VOVS is fed to the reset input of the SR flip-flop 201 by way of the OR gate 406 to turn OFF the top switch S5, stopping charging of the output capacitor C1 by the input voltage VIN through the output inductor L2. The other input of the OR gate 406 receives the signal from the PWM comparator 222 to turn OFF the top switch S5 in normal PWM operation.

Similar to the dynamic load current detector 112 of FIG. 3, the overshoot detection circuit 420 includes an amplifier 421 that compares the feedback signal FB at the node 405 (see also FIG. 16) to the output voltage VOUT at the node 404. As previously explained, the difference between the feedback signal FB and the output voltage VOUT is indicative of change in load current. The output of the amplifier 421 is filtered by a filter formed by a resistor R70 and a capacitor C71. A comparator 422 compares the load current change information with a predetermined reference voltage Vov to determine if the load current step-down change is large enough to cause an overshoot. An offset voltage VOS allows the reference signal Vov to be adjusted for optimization. If the change in load current is large enough to cause an output voltage overshoot, the comparator 422 outputs the overshoot control voltage VOVS to switch OFF the top switch S5.

Figure 18:
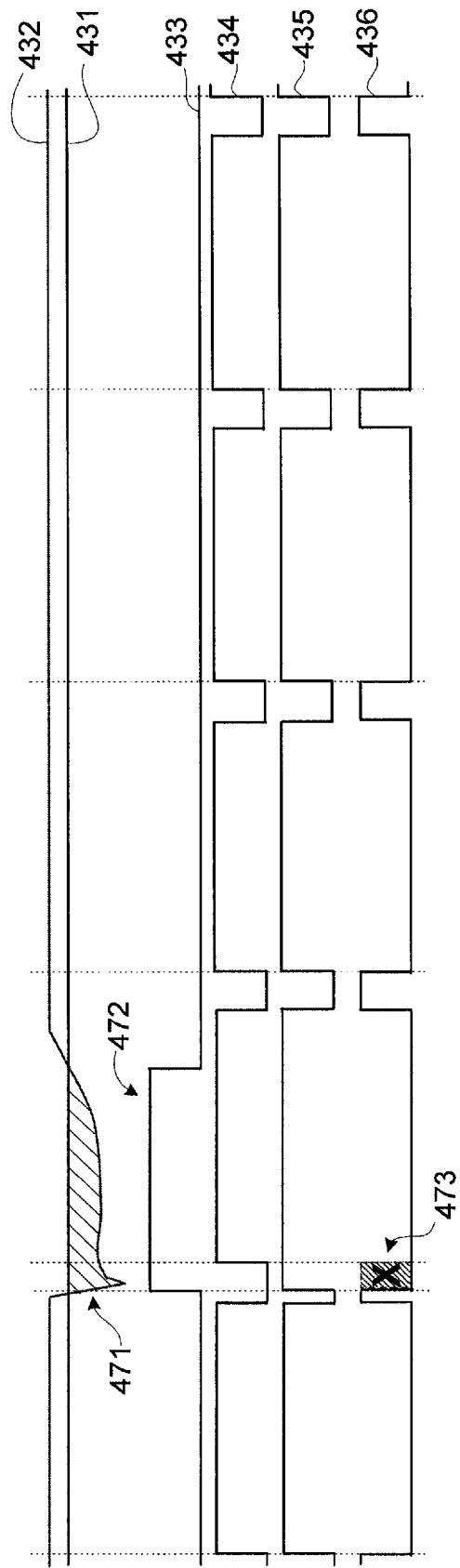
FIG. 18 shows waveforms at various nodes of the circuit of FIG. 17.

FIG. 18 shows waveforms at nodes 431-436 of the circuit shown in FIG. 17. The waveforms of FIG. 18 are not to scale. The label of each of the waveforms in FIG. 18 corresponds to the same labeled node in FIG. 17. In the example of FIG. 18, the amplifier 421 detected a load current step-down change (see 471) that is sufficiently large to result in an output voltage overshoot. This results in the comparator 422 generating the overshoot control voltage VOVS (see 472), which in turn resets the SR flip-flop 201 to turn OFF the top switch. Waveform 434 is the PWM comparator 222 output signal that is used to turn OFF the top switch S5 through the flip-flop 201. Waveform 435 is the output generated by the OR gate 406 as a result of input waveforms 433 and 434. The overshoot control voltage VOVS essentially inserts a top switch OFF time (portion of signal at node 436 marked with an "X"; see 473) to cut off charging of the output capacitor C1 to control output voltage overshoot.

Figure 19:
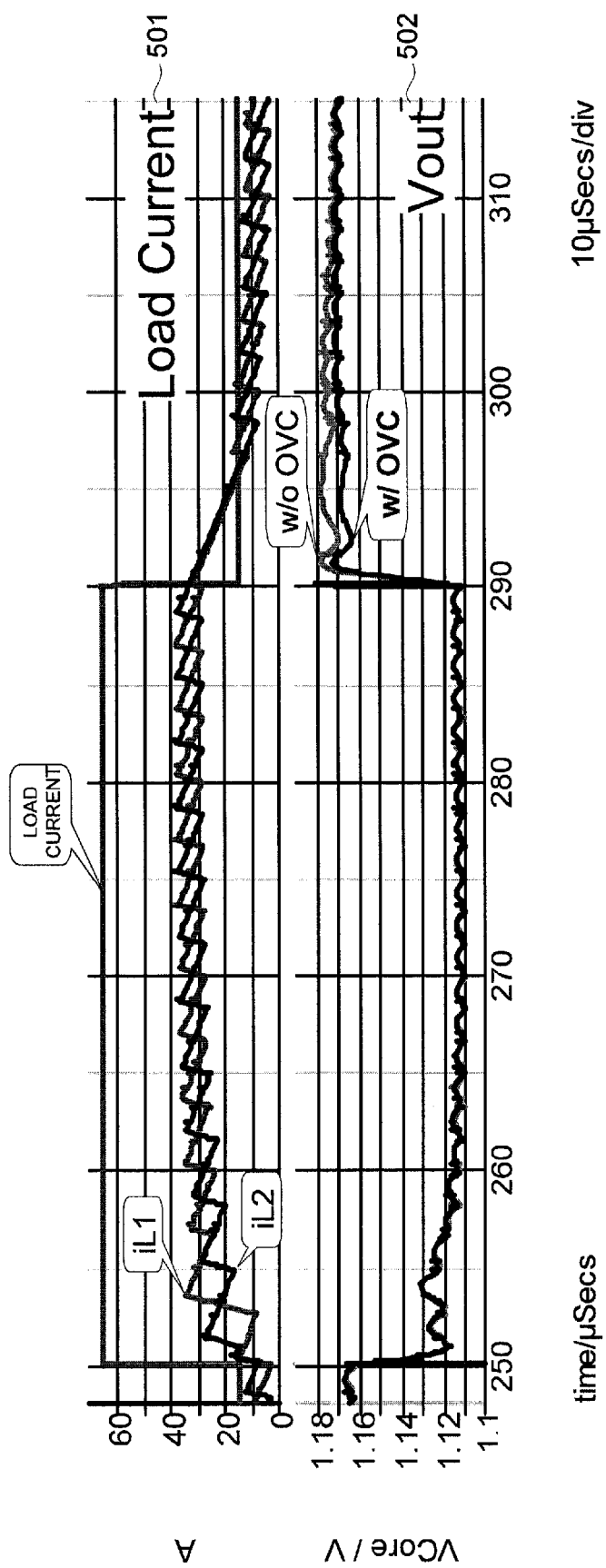
FIG. 19 shows simulation waveforms of the voltage regulator of FIG. 16.

FIG. 19 shows waveforms 501 and 502 of a simulation of the voltage regulator 400 of FIG. 16. In waveforms 501 and 502, the horizontal axis represents time in microseconds, while the vertical axis represents signal value (amps for current and volts for voltage). The waveforms 501 and 502 simulate a load current step-down change from 65 A to 15 A at 50 ns for a two-phase voltage regulator 400. The waveforms 501 show load current, while the waveforms 502 show corresponding output voltage VOUT. In the waveforms 501, the waveform labeled as "iL1" represents inductor current for a first phase and the waveform labeled as "iL2" represents inductor current for a second phase.

In the waveforms 502, the waveforms labeled "w/ OVC" and "w/o OVC" represent a voltage regulator 400 with and without output voltage overshoot control, respectively. Note that with overshoot control, the resulting overshoot is smaller compared to that without overshoot control.

FIG. 20 shows the difference phases of a regulator 400 in accordance with an embodiment of the present invention. In the example of FIG. 20, the regulator 400 includes a plurality of phase output blocks 510 (i.e., 510-1, . . . , 510-n), one for each phase. Each phase output block 510 has a corresponding sensed inductor current iL (iL1, . . . , iLn) and phased linear clock CLK (CLK1, . . . , CLKn). In the example of FIG. 20, the droop control circuit 225 receives sensed inductor current iL from each phase output block 510 to control droop of the output voltage VOUT. The overshoot detection circuit 420 generates the overshoot control voltage VOVS upon detection of fast load current step-down change. The overshoot control voltage VOVS is provided as an input to the OR gate 406 of each of the phase output blocks 510 to turn OFF a corresponding top switch S5 to control the overshoot. In effect, the overshoot detection circuit 420 turns OFF all top switches in the regulator upon detection of an output voltage overshoot. The operation of the components shown in FIG. 20 is otherwise as explained with reference to FIG. 16.

Figure 21:
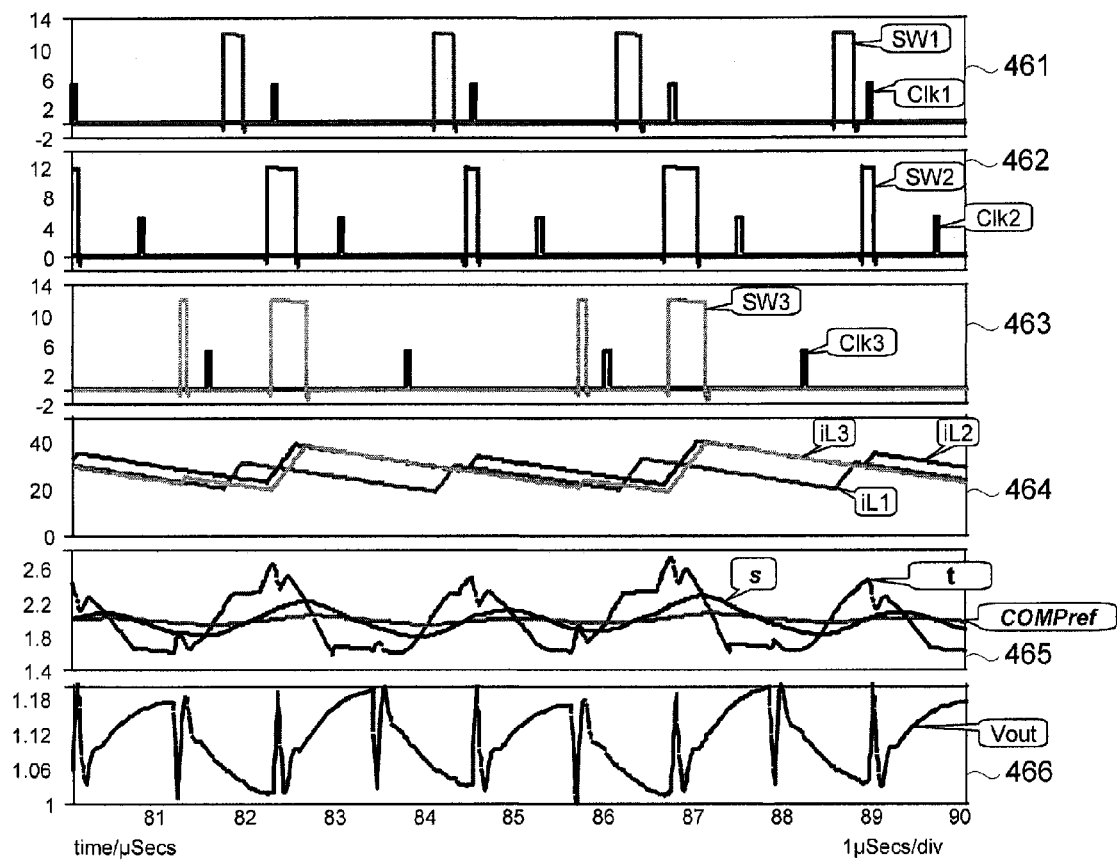
FIG. 21 shows timing diagrams of a simulation of an improved voltage regulator incorporating non-linear control as in FIG. 2, load release dip control as in FIG. 7, ring-back control as in FIG. 12, and overshoot control as in FIG. 16.

FIG. 21 shows waveforms 461-466 of a simulation of an improved voltage regulator incorporating non-linear control as in FIG. 2, load release dip control as in FIG. 7, ring-back control as in FIG. 12, and overshoot control as in FIG. 16. In this simulation, the load current changes at high slew rate and high repetition rate (450 kHz) that is the same as the per phase switching frequency. In the waveforms 461-466, the horizontal axis represents time in microseconds, while the vertical axis represents signal value (amps for current and volts for voltage).

Waveforms 461-463 show a linear clock signal CLK and a signal at the corresponding switch node SW for the improved voltage regulator with three phases. In the waveforms 461-463, the "1" after "CLK" and "SW" indicate an item for the first phase. That is, the linear clock signal CLK1 and the switch node SW1 are the linear clock signal CLK and switch node SW, respectively, for the first phase. Similarly, the inductor current iL1 in the waveforms 464 is the inductor current for the first phase, the inductor current iL2 is the inductor current for the second phase, and so on. As can be appreciated, the features described herein may be employed in one or more phases as appropriate for the particular application.

In the waveforms 465, the slow comparison signal s is for ring-back control (see input of the buffer 354 of FIG. 12) and the reference signal COMPref is for load release dip control (see input of the buffer 227 of FIG. 7). The adaptively clamped COMP signal t connects to and is the actual control signal for the comparator 222 of FIG. 12 (see clamped COMP signal t connecting to the comparator 222 in FIG. 12). The waveform 466 shows the simulated output voltage VOUT. The improved voltage regulator achieves relatively consistent phase advance with minimum delay as needed with non-linear control and good dynamic phase current balancing at high load current repetition rates. With load release dip control, ring-back control, and overshoot control, transient response of the improved voltage regulator allows for more stable/less oscillatory output voltage VOUT even with high load current repetition rates.

At high load current repetition rates with high slew rates, load step-down can occur before load step-up transition becomes fully settled, and vice versa. Therefore, load release dip, ring-back, overshoot etc. can significantly affect the initial condition of the next load step transition. The resulting uncertainty in initial conditions can adversely affect the total output regulation tolerance band. With the techniques disclosed herein, load current transition at high load current repetition rates and high slew rates can be controlled by minimizing, or even eliminating, the output voltage settling time for a fast load current step change, so that the regulator is able to meet increasingly tighter tolerance band regulation requirements.

Improved voltage regulators have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of operating a voltage regulator, the method comprising:
   using a linear control circuit to control a switch of a voltage regulator to charge an output capacitor and provide power to a load;
   detecting a step change of a load current drawn by the load from the regulator;
   responding to the step change of the load current by clamping an output voltage of a voltage error amplifier of the linear control circuit to control transient response of the regulator to the step change of the load current.

2. The method of claim 1 wherein the step change results in the load current having a step size equal to or greater than a pre-determined non-linear control threshold.

3. The method of claim 1 wherein detecting the step change of the load current drawn by the load from the regulator comprises:
   comparing an output voltage of the regulator with a feedback voltage at an input of the voltage error amplifier of the linear control circuit, the error amplifier generating a comparison signal based on a difference between the feedback voltage and a reference voltage.

4. The method of claim 1 wherein the clamping of the output of the voltage error amplifier of the linear control circuit turns OFF the switch when using a non-linear control circuit to control the switch.

5. The method of claim 1 wherein the clamping of the output of the voltage error amplifier of the linear control circuit to prevents output voltage load release dip.

6. The method of claim 1 further comprising:
   turning OFF the switch before inductor current flowing through an output inductor of the regulator reduces to zero to prevent the output voltage from overshooting.

7. A voltage regulator comprising:
   a first switch and a second switch;
   a linear control circuit configured to control the first and second switches to control charging of a load and an output capacitor coupled to a load;
   a non-linear control circuit configured to charge the output capacitor and a load upon occurrence of a step change of a load current drawn by the load;
   a clamping circuit configured to adaptively clamp an output of an error amplifier of the linear control circuit, wherein the clamping circuit comprises a first buffer configured to receive the output of the error amplifier and output a reference error amplifier signal, a filter coupled to delay the reference error amplifier signal, and a second buffer configured to receive the delayed reference error amplifier signal and output the delayed reference error amplifier signal to a PWM comparator of the regulator.

8. The regulator of claim 7 further comprising:
   a load current detector configured to compare an output voltage of the regulator with a feedback input of an error amplifier of the linear control circuit to sense the dynamic load current step change.

9. The regulator of claim 7 wherein the clamping circuit is configured to clamp the output of the error amplifier when the non-linear control circuit is activated or when the load release dip happens.

10. The regulator of claim 8 wherein the non-linear control threshold is pre-determined.

11. A method of operating a voltage regulator, the method comprising:

controlling switching of a pair of synchronously switched transistors by pulse width modulation (PWM) using a linear control circuit;

detecting step change of load current drawn by a load from the regulator; and controlling transient response of the regulator to the step change of the load current by clamping an output of a voltage error amplifier of the linear control circuit to turn OFF a top switch of the synchronously switched transistors.

12. The method of claim 11 wherein detecting the step change of the load current drawn by the load from the regulator comprises:

comparing an output voltage of the regulator with a feedback voltage input of an error amplifier of the linear control circuit, the error amplifier generating a comparison signal based on a difference between the feedback voltage and a reference voltage.

13. The method of claim 11 wherein the error amplifier is coupled to a voltage loop of the regulator.

14. The method of claim 11 further comprising controlling transient response of the regulator to the step change of the load current using a non-linear control circuit.

15. The method of claim 11 further comprising:

switching an input to a PWM comparator of the linear control circuit depending on whether the synchronously switched transistors is controlled using the linear control circuit or a non-linear control circuit, the PWM comparator being coupled to a current loop of a current mode control loop of the regulator.

* * * * *